(12) United States Patent
Horii et al.

(10) Patent No.: US 6,955,287 B2
(45) Date of Patent: Oct. 18, 2005

(54) METHOD OF BONDING METAL PLATES, APPARATUS THEREFOR AND HOT STRIP MILL

(75) Inventors: Kenji Horii, Hitachi (JP); Yasutsugu Yoshimura, Hitachi (JP); Tadashi Nishino, Hitachi (JP); Takashi Kamoshita, Hitachinaka (JP); Takayoshi Tomino, Hitachi (JP); Fuminori Ishikawa, Hitachiohta (JP); Takao Funamoto, Hitachi (JP); Takashi Mashiko, Hitachi (JP); Kenjiro Narita, Hitachinaka (JP); Jong-Keun Kim, Pohang (KR); Ki-Chol Kim, Pohang (KR); Jong-Sub Lee, Pohang (KR); Hwang-Kyu Hwang, Pohang (KR); Jung-Sik Lee, Pohang (KR); Jin-Hee Kim, Pohang (KR)

(73) Assignees: Hitachi, Ltd., Tokyo (JP); Pohang Iron and Steel Co., Ltd., Pohang-Si (KR); Research Institution of Industrial Science and Technology, Pohang (KR)

( * ) Notice: Subject to any disclaimer, the term of this patent is extended or adjusted under 35 U.S.C. 154(b) by 0 days.

(21) Appl. No.: 09/735,548

(22) Filed: Dec. 14, 2000

(65) Prior Publication Data

US 2001/0017312 A1 Aug. 30, 2001

(30) Foreign Application Priority Data

Dec. 14, 1999 (JP) ............................................. 11-354215
Oct. 17, 2000 (JP) ....................................... 2000-316522

(51) Int. Cl.[7] .............................................. B21D 21/00
(52) U.S. Cl. .................... 228/141.1; 228/144; 228/149; 228/5.7
(58) Field of Search ................................. 228/115, 116, 228/117, 141.1, 144, 149, 5.7, 15.1, 49.4

(56) References Cited

U.S. PATENT DOCUMENTS

| 5,216,962 A | 6/1993 | Parigi et al. |
| 5,234,154 A | * 8/1993 | Kajiwara et al. ........... 228/158 |
| 6,213,381 B1 | * 4/2001 | Funamoto et al. ....... 228/141.1 |

FOREIGN PATENT DOCUMENTS

| EP | 0770434 | 5/1997 |
| JP | 06039405 | 2/1994 |
| JP | 06234005 | 8/1994 |
| JP | 09174117 | 7/1997 |

OTHER PUBLICATIONS

EPO Search Report.

* cited by examiner

Primary Examiner—Jonathan Johnson
Assistant Examiner—Len Tran
(74) Attorney, Agent, or Firm—Crowell & Moring LLP

(57) ABSTRACT

An upper shearing blade equipped with a protrusion of a triangle-columnar shape and a lower shearing blade equipped with a protrusion of the same shape are applied onto the overlapped portion of metal plates to be bonded, and then pressed into the metal plates in an oblique direction inclined with respect to the thickness direction by a stroke in such a range that the metal plates are not completely cut off. The operating loci of the upper, shearing blade and the lower shearing blade are overlapped each other so that one falls inside the other, and the sheared surfaces of the metal plates are formed into a bonded portion by plastic flow deformation. Therein, since a compressive force is applied onto the portions to be bonded, the portion being defined by the amount of overlap, and the portions are compressed to form a compressed portion after completion of bonding, the bonding strength enhances. Besides, since the protrusions on the shearing blades generate a pressing force pressing the sheared surfaces onto each other, by an effect of their inclined surfaces, a compression force applied onto the bonded portion further increases.

4 Claims, 24 Drawing Sheets

STROKE: L3 = L2 - L1 - L4

METHOD OF BONDING METAL PLATES, APPARATUS THEREFOR AND HOT STRIP MILL

This application claims the priority of Japanese Patent Application No. 11-345215, filed in Japan Dec. 14, 1999, and Japanese Patent Application No. 2000-316522, filed in Japan Oct. 17, 2000, the disclosures of which are expressly incorporated by reference herein.

BACKGROUND OF THE INVENTION

The present invention relates to a method of bonding multiple metal plates, an apparatus therefor, and a hot strip mill; particularly to a method of bonding hot rolled strips which makes it possible to bond the hot rolled strips in a short time and perform continuous rolling in case where the hot rolled strips are rolled by a set of coarse rolling mills and a set of finish rolling mills.

There has been a keen desire for performing finish rolling continuously in a hot strip mill for metal plates so as to improve productivity and quality as well as to realize automated operation. A key technique to this continuous finish rolling is how to bond hot rolled strips (hereinafter called sheet bars). In case of cold rolled strips, continuous rolling operation associated with bonding with sufficient strength, such as by welding, is possible because the cold rolled strips are thinner. In case of hot rolled strips, however, rolling speed (feeding speed of rolled strips) is faster than in a cold strip mill and accordingly bonding by means of welding is difficult, because the hot rolled strips are thicker and because the rolling operation must be completed before the temperature of the rolled strips becomes lower.

Up to now, there have been a number of proposed methods of bonding sheet bars, including an electric heating method, a gas heating method, a melt-chopping method, and a friction method, but each has a disadvantage that bonding process takes too much time. Since the rolling speed of the hot rolled strips is faster as described above, a running type bonding machine cannot be realized unless bonding the sheet bars is completed in a short time, because the traveling distance of the machine becomes longer. If a fixed type bonding machine is employed, a huge looper for accumulating sheet bars becomes necessary, because sheet bars are normally as thick as 20 to 50 mm. A conventional bonding process of the sheet bars took 20 to 30 seconds, at the shortest, including preparation for bonding and removal of roll-over and burrs caused by pressing.

Known as a technique for shortening the bonding time of hot rolled strips is one disclosed in Japanese Patent Application Laid-Open Publication No. HEI 9-174117 (1997). According to this technique, a preceding sheet bar and a following sheet bar are overlapped and then the two sheet bars are sheared at the same time, during which clean surfaces are brought into direct contact with each other so as to achieve strong metal bonding.

SUMMARY OF THE INVENTION

According to the bonding technique disclosed in Japanese Patent Application Laid-Open Publication No. HEI 9-174117 (1997), there is provided a shearing blade and a clamp on one side and a support on the other side, wherein two overlapped bars are clamped by the support and the clamp, and then the shearing blade is operated under that condition so as to bond clean surfaces. This method is very much suitable particularly for a hot strip mill because bonding can be completed simply and in a short time.

However, the method is associated with a problematic point that needs to be improved in order to achieve sufficient bonding strength in a short time while keeping bend of the bonded metal plates to the minimum. There is another problem that the remaining crop after bonding becomes longer because the material is clamped from the support side. Besides, there is another problem that the material movability is deteriorated because the metal plates are bent toward the support side.

The object of the present invention is to overcome the above problems in the prior art and provide a method of bonding metal plates and an apparatus therefore which are capable of achieving sufficient bonding strength and shortening the crop length. Another object is to provide a hot strip mill to which this bonding method can be applied on-line and in which the length of a production line can be shortened.

In order to achieve the above objects, the present invention provides a method of bonding metal plates by which the overlaps portions of the metal plates to be bonded are overlapped, the shearing blades arranged opposite with respect to the overlapped portion are applied onto both sides of the metal plates, and then, while moving the shearing blades relatively so as to sandwich the overlapped portion, a bonded portion is formed at the overlapped portion by making use of the plastic flow deformation of each sheared surface to be generated during the shearing process.

According to the bonding method of the invention, a pressing force is applied onto the sheared surface to be generated during the shearing process by the opposed shearing blades so as to press the sheared surfaces onto each other. This pressing force is generated by the resistance at a point of contact between the shearing blade and the material. This makes it possible to apply a compressive force onto the bonded portion and reduce the sectional area of the bonded portion, and consequently improve the bonding strength. When the pressing force is applied onto the sheared surface, the bonded portion or bonded surface becomes inclined with respect to the thickness direction of the metal plates. This inclination angle shall preferably be 75° or less.

Overlapping the shearing blades is another method for generating a pressing force compressing the bonded portion. Overlapping the shearing blades is a method for moving the shearing blades so that the extension line of the operating locus of an edge of one shearing blade falls inside the edge of the other opposed shearing blade. When viewed from the above, the shearing blades look as if partly overlapped each other at least at the time of completion of bonding.

FIG. 23 shows several examples of overlapped shearing blades. (a) is an example where the upper and lower shearing blades 3 and 4 are in parallel to the thickness direction of the metal plates, and a gap "ε" between the extension lines of the operating loci of the upper and lower shearing blades is the amount of overlap. (b) and (c) are examples where the operating loci of the upper and lower shearing blades 3 and 4 are inclined with respect to the thickness direction but the two examples differ in the direction of inclination. The amount of overlap with respect to the thickness direction of the metal plates shall preferably be within a range of 0.1 mm to 15 mm.

In either case, because a pressing force pressing the sheared surfaces onto each other is generated during the shearing process by the shearing blades moving along each operating locus, the hatched portion before bonding is compressed as if the hatched portion after bonding. In this process, the bonded portion or bonded surface (a plane between the edges of the opposed shearing blades) after completion of bonding always becomes inclined with respect to the thickness direction of the metal plates.

In order to generate a pressing force compressing the bonded portion, other than a method where the extension lines of the operating loci of the shearing blades are set in parallel to each other by an amount of overlap "$\epsilon$" (FIG. 23), it is allowable that one or both of the operating loci cross the shearing blades in an oblique direction. By this, a compressive force is applied onto the bonded portion and the bonded portion or bonded surface generated also becomes inclined.

In this invention, as a means for increasing this pressing force tremendously, there is provided a protrusion (resistance) which generates a resilient force against the shearing force, that is, a pressing force similar to the above pressing force on the edge of the shearing blade. In this case, because the pressing force to be generated by the protrusion is big enough, bonding strength can be enhanced even with a construction where either an upper or lower shearing blade is provided on one side and a support is provided on the other side, as compared to a case in the prior art.

The protrusion is formed, for example, in a triangle-columnar shape having an apex in the thickness direction and a width in the width direction of the metal plates. Besides, it is preferred that the surface of the protrusion opposed to the sheared surface (protrusion surface) is so formed that the protrusion angle ($\theta_D$) with respect to the horizontal surface of the metal plate is 30° or more and, at the same time, less than the angle between a line parallel to the operating locus of the edge and the above horizontal surface.

The stroke of the shearing blade shall preferably be within a range where the plastic flow deformation in the shearing process acts effectively and, at the same time, the overlapped portion is not entirely cut off, that is, within 50% to 150% of the thickness of the metal plate.

Since the overlapped metal plates can be bonded together without cutting off entirely in shearing the metal plates by pressing the shearing blades, energy for the pressing can be reduced. Besides, if the stroke is set equal to or longer than the plate thickness, a connection remaining between the crop and the bonded metal plates as a result of bonding becomes negligible or zero, and consequently post-processing becomes easier.

Further, in the shearing process by the upper and lower shearing blades, a clamping force is applied, corresponding to the pressing force generated, so as to sandwich the overlapped portion. With this clamping force, the overlapped portion is maintained in place and the compression of the bonded portion due to the pressing force is performed effectively.

The aforementioned apparatus for bonding metal plates according to the present invention has been applied to a production line between a coarse rolling mill and a finish rolling mill for rolling hot rolled strips. The bonding apparatus comprises an overlapping mechanism which overlaps the portions to be bonded of the preceding bar and the following bar each other, a bonding mechanism equipped with upper and lower shearing blades which, while pressing and shearing the bars from above and from below, bond the two overlapped bars, and a shearing blade drive mechanism which causes the shearing blades to perform a pressing motion.

The shearing blade has an edge angle ($\theta$x) nearly consistent with the operating locus of the edge that is inclined with respect to the thickness direction of the bar, and there is provided, on the top surface of the shearing blade, a protrusion which bites into the bar when the blade is pressed. This protrusion not only helps increase the pressing force but makes it easier for the shearing blade to follow the bar motion.

The shearing blade drive mechanism is so constructed as to perform a cyclic operation by causing the upper and lower shearing blades to stand by at a specified stand-by position, starting pressing the shearing blades when the overlapped portion of the two bars has reached the bonding mechanism, and then returning the shearing blade back to the stand-by position when the shearing blades have moved a specified pressing stroke up to the completion of bonding; and a synchronous operation by moving the shearing blades so as to follow the bar movement while the shearing blades are in contact with the bars.

Since the time required for bonding by the bonding method of the invention is short enough thanks to the upper and lower shearing blades and big pressing force, the bonding process by the shearing blades can be realized in synchronism with the bar movement, and hence smooth bonding can be performed.

Further, since the overlapping mechanism is so constructed as to increase the following bar speed and overlap the two bars when the trailing end of the preceding bar has reached a specified position, and return the bar speed to an original one when the overlapped portion has reached a specified length, the apparatus can cope with a difference in rolling speed between mills. In addition, the overlapped portion includes an "omit" portion of at least either one of the preceding bar or the following bar. Because of this, a portion that used to be thrown away as an omit portion is now kept as a crop after bonding, yield of the material can be improved.

Furthermore, by descaling a portion of the preceding bar and that of the following bar, which are to be overlapped each other, in a process prior to the overlapping portion, unnecessary heat radiation from the hot rolled strips can be avoided. Besides, by completing the overlapping process within 20 seconds after the descaling, the thickness of scale growing after the descaling can be limited to such a level that does not cause rupture of the strips during the rolling process.

According to the hot strip mill of the present invention, because the time required for bonding is short, smooth synchronism with the bar movement becomes easier and, when the bonding machine is employed on-line in a production line, continuous connection of the sheet bars becomes possible. In addition, the length of a rolling mill line can be shortened since, for example, a looper required for adjusting the speed can be omitted.

DETAILED EXPLANATION OF THE PREFERRED EMBODIMENTS

Figure 1:
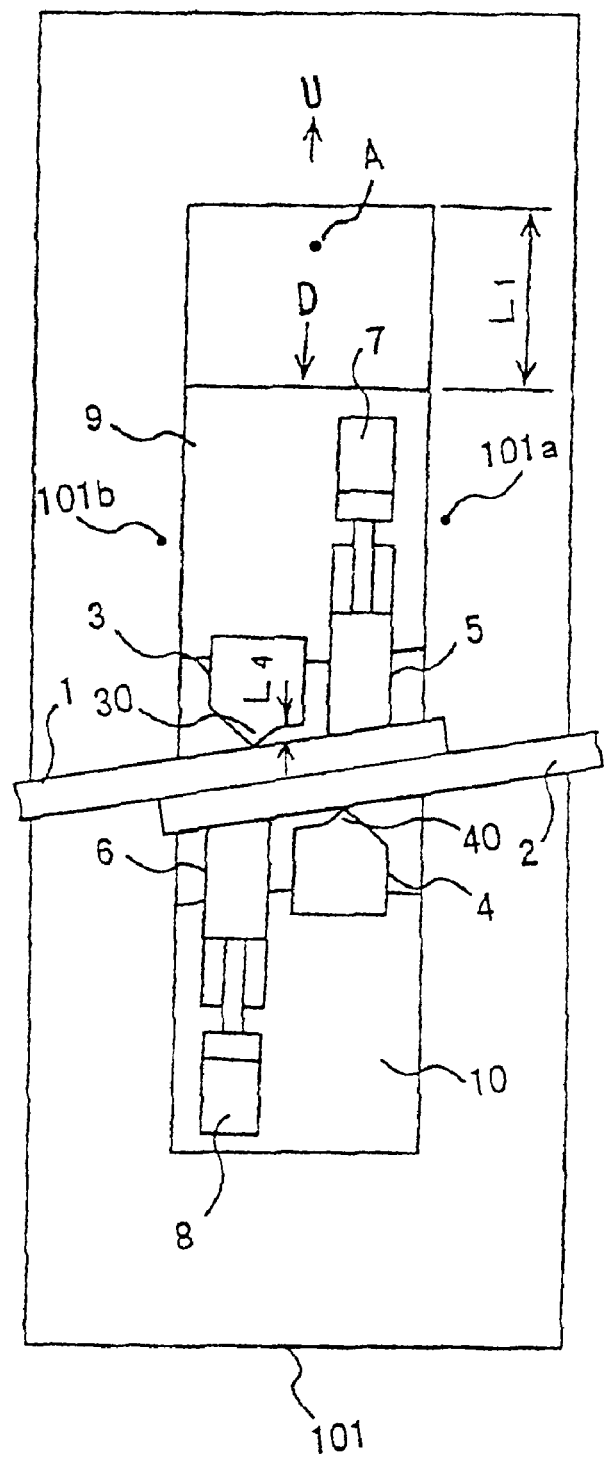
FIG. 1 is a structural drawing showing the basic construction of the apparatus of bonding metal plates according to an embodiment of the present invention.

An embodiment of an apparatus for bonding metal plates according to the present invention is explained in detail hereunder, using drawing figures. Metal plates to be bonded are hot rolled strips that do not need to be heated anew. FIG. 1 is a typical drawing showing the basic construction of the bonding apparatus at the start position of bonding.

An upper bar 1 and a lower bar 2 of hot rolled strips overlapped each other are sandwiched by an upper shearing blade 3 equipped with a protrusion 30 and a lower shearing blade 4 equipped with a protrusion 40 (each protrusion 30 and 40 is in contact with the bar surface). Each of the protrusion 30 of the upper shearing blade 3 and the protrusion 40 of the lower shearing blade 4 is a triangle-columnar protrusion provided at an optional position (at the center, for example) along the entire longitudinal direction on each side edge of the shearing blades arranged opposite, and generates a pressing force for pressing the sheared surfaces onto each other while the shearing blades 3 and 4 performs motion as explained later. The height of the protrusions 30 and 40 is specified L4.

An upper clamp 5 and a lower clamp 6 are also in contact with the upper bar 1 and the lower bar 2, respectively. The upper clamp 5 is supported by an upper clamp support 7 and the lower clamp 6 is supported by a lower clamp support 8, each using a hydraulic pressure provided as needed. The upper shearing blade 3, upper clamp 5 and upper clamp support 7 are formed into a unit as an upper shearing blade assembly 9. Similarly, the lower shearing blade 4, lower clamp 6 and lower clamp support 8 are formed into a unit as a lower shearing blade assembly 10. When an external force, not shown, is applied, each shearing blade 3 and 4 starts performing a pressing stroke $F_D$. A clamp supporting force $F_T$ is applied onto each upper and lower clamp 5 and 6.

The upper shearing blade assembly 9 and the lower shearing blade assembly 10 are mounted in a housing 101, wherein the upper shearing blade assembly 9 is so installed as to be guided by posts 101a and 101b of the housing 101 and move in an oblique direction with respect to the thickness direction of the bars 1 and 2. The upper shearing blade assembly 9 and the lower shearing blade assembly 10 are so constructed as to be able to be moved closer to or apart from point A shown in the figure by means of a linkage to be explained later. Accordingly the shearing blade assemblies 9 and 10, sandwiching the upper bar 1 and the lower bar 2 are able to move closer to or apart from each other.

The upper shearing blade assembly 9 moves in the direction of an arrow D in the bonding process, and moves to return in the opposite direction U of the arrow D after bonding. The lower shearing blade 4, lower clamp 6 and lower clamp support 8 are constructed as the lower shearing blade assembly 10, similarly to the upper shearing blade assembly 9. It is also possible to so construct the bonding apparatus that either one of the lower shearing blade 4 or the upper shearing blade 3 is only moved. Further, it is also allowable that the upper and lower clamps move in the thickness direction and the upper shearing blade 3 and the lower shearing blade 4 move in an oblique direction along the edge angle of each shearing blade.

Figure 2:
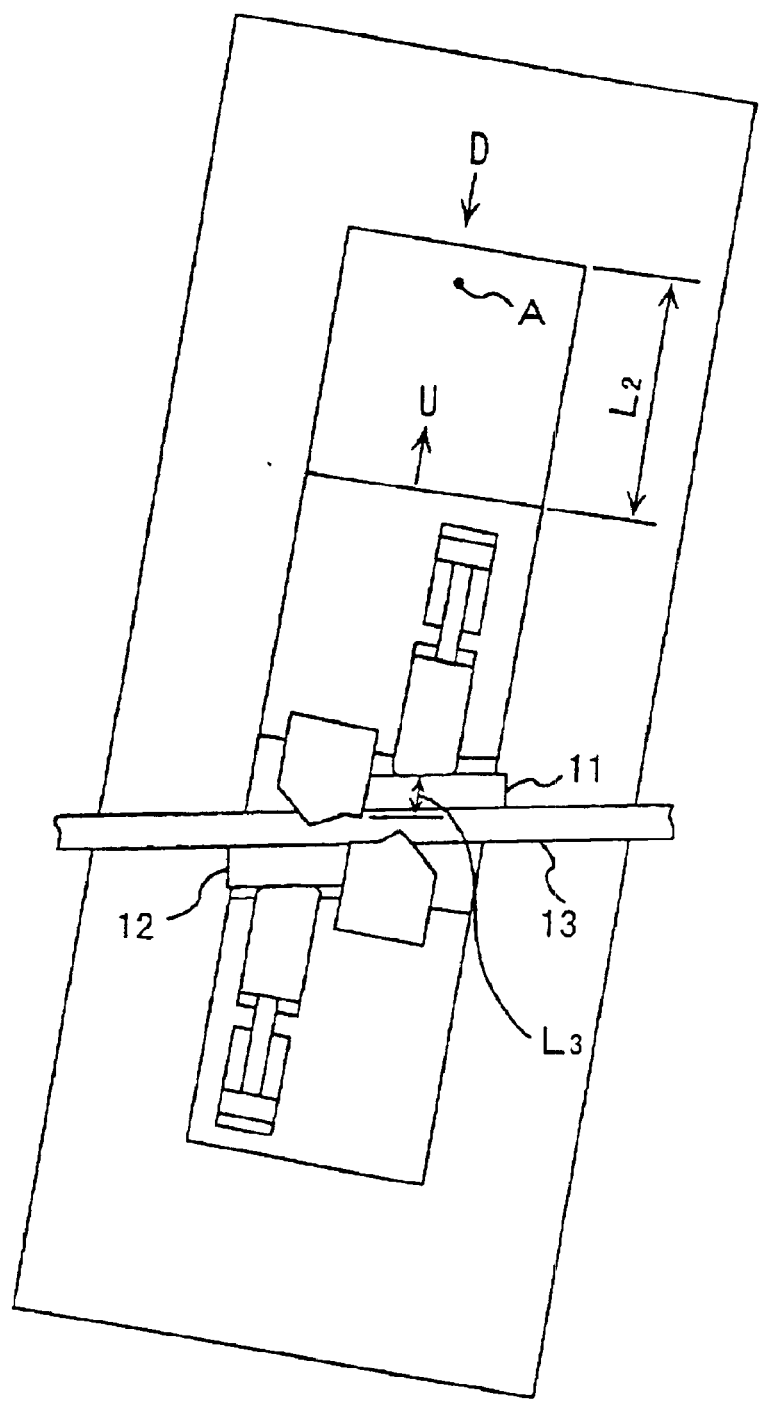
FIG. 2 is a structural drawing showing the bonding apparatus in FIG. 1 upon completion of bonding.
Figure 3:
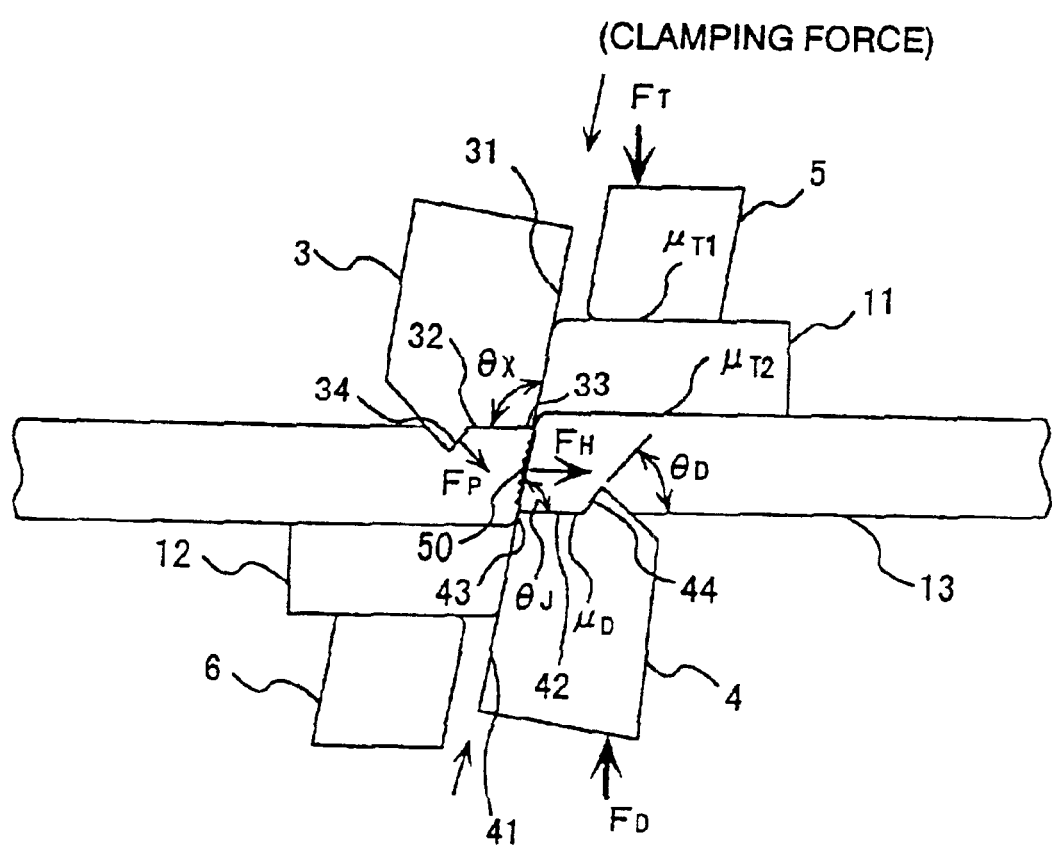
FIG. 3 is an explanatory drawing showing a geometric relationship between the shape of the edge (shearing blade) and the bar upon completion of bonding.

FIG. 2 shows the bonding apparatus upon completion of bonding. While the upper shearing blade 3 and the lower shearing blade 4 shear the bars 1 and 2, respectively, the bars 1 and 2 are bonded together at each sheared surface, forming a connected bar 13. At the completion position of the bonding operation (L2), a connected bar 13 has been formed, and an upper crop 11 and an lower crop 12 have been separated or have begun to be separated. After this, the upper shearing blade assembly is moved in the arrow direction U and returned toward the start position (L1) as shown in FIG. 1. The lower shearing blade 4 also operates as explained above. As shown in FIG. 3, a moving distance from a position where the top surfaces 32 and 42 of the upper and lower shearing blades 3 and 4 are in contact with the bars 1 and 2, respectively, that is, the protrusions 30 and 40 have bitten into each bar by its height L4 to the completion position of bonding is called a pressing stroke (L3=L2−L1−L4).

As described above, in the bonding apparatus according to this embodiment, the shearing blades 3 and 4 are arranged opposite to each other on both sides of the overlapped portion of the upper and lower bars, and there is provided a mechanism that moves the opposed shearing blades relatively so as to sandwich the overlapped portion. The overlapped portion has enough length to be supported by the clamps 5 and 6 mounted outside the shearing blades 3 and 4, respectively. The operating locus of the shearing blades in the bonding process is so set as to form an inclination angle with respect to the thickness direction of the bars so that the bonded line is inclined with respect to the thickness direction. Further, there is provided a triangle-columnar protrusion on the surface of each shearing blade that is in contact with the bar surface so that a pressing force pressing the sheared surfaces onto each other is generated by a surface of the triangle during the moving process.

FIG. 3 is an explanatory drawing showing a geometric relationship between the shape of the shearing blade and the bar upon completion of bonding. The shearing blades 3 and 4 equipped with the protrusions 30 and 40, respectively move along an operating locus of the edge in a direction shown by an arrow. Herein, $\theta_D$ is defined as a protrusion angle of the shearing blades 3 and 4, $\theta_J$ as an inclination angle of the bonded portion, and $\theta_X$ as an open angle of the edge. The upper shearing blade 3 with its top surface 32 is in contact with the bar 1, and is moved in an oblique direction nearly consistent with the inclination of the side surface 31 caused by the open angle $\theta_X$ of the edge, that is, in the direction of an arrow. The same applies to the lower shearing blade 4. In this operation, it is not necessary to maintain $\theta_X$ completely consistent with the arrow direction, but a difference of several degrees is left normally.

As the pressing force $F_D$ and the clamp supporting force $F_T$ are applied, the edges 33 and 43 of the shearing blades 3 and 4 are pressed and the sheet bars 1 and 2 are sheared along the open angle $\theta_X$ of the edge, and then the sheared surfaces of the sheet bars are plastic-deformed and bonded together. Therein, the open angle $\theta_X$ of the edge is set greater than 90° so as to press the edges into the sheet bars in an oblique direction.

Further, since the shearing blades 3 and 4 are equipped with the protrusions 30 and 40, respectively in this embodiment, a pressing force $F_P$ is generated in a direction perpendicular to the protrusion surfaces 34 and 44 that are defined by the protrusion angle $\theta_D$, and a horizontal component of the force is $F_H$. This horizontal force $F_H$ acts as a compressive force onto a compressed portion, and a clamp supporting force $F_T$ is applied as a force for supporting the horizontal force $F_H$.

Relationships among the clamping force $F_T$, horizontal force $F_H$, and protrusion angle $\theta_D$ are explained hereunder. The friction coefficient between the upper clamp 5 and the upper crop 11 is denoted as $\mu_{T1}$, the friction coefficient between the upper crop 11 and the connected bar 13 as $\mu_{T2}$, and the friction coefficient between the lower shearing blade 4 and the connected bar 13 as $\mu_D$. When $\mu_{T1}$ or $\mu_{T2}$, whichever smaller, is denoted as $\mu_T$, $F_H$ can be expressed as a function of $F_T$ and $\theta_D$ as equation (1) below.

$$F_H = F_T(\mu_T(1-\sin 2\theta_D + \mu_D \sin\theta_D \cos\theta_D) + \mu_D)/(1-\sin 2\theta_D) \quad (1)$$

Figure 4:
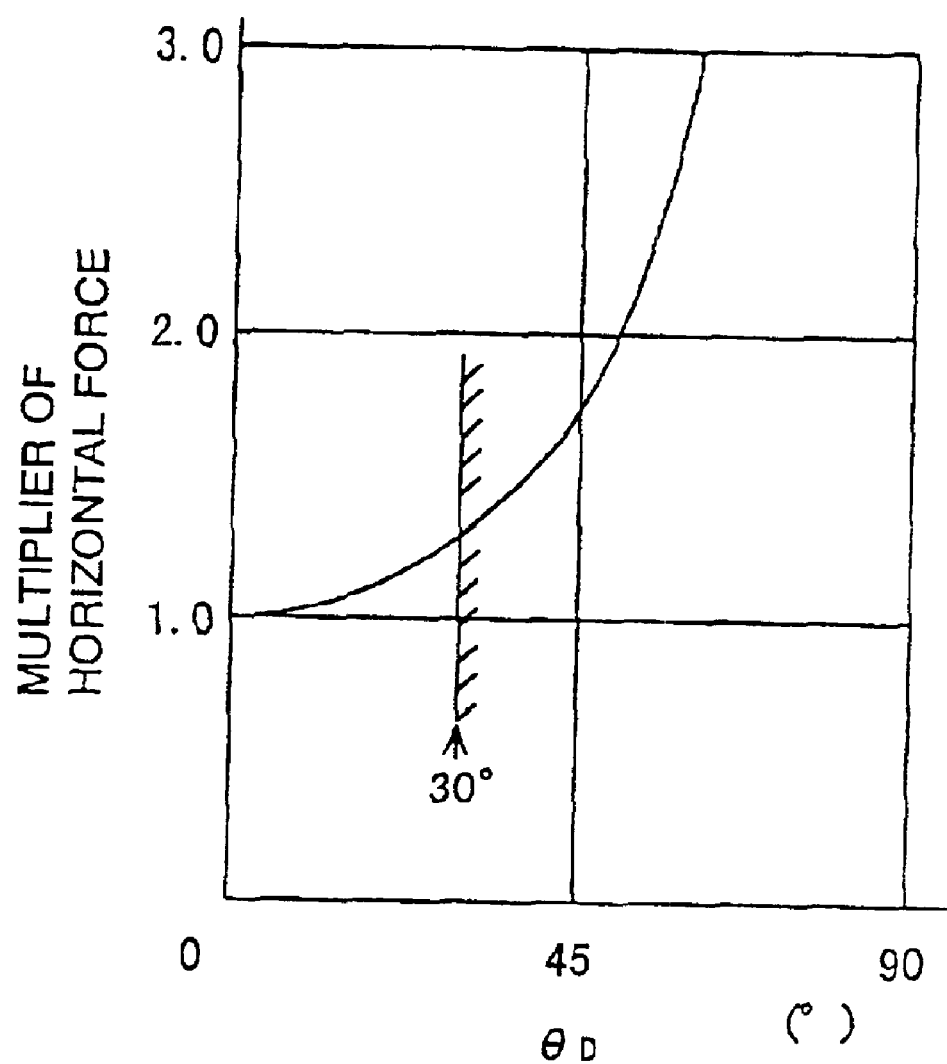
FIG. 4 is a characteristic chart showing the relationship between the protrusion angle $\theta$D of the protrusions and the horizontal force.

FIG. 4 shows the relationship between a multiplier $F_H/F_T$ of the horizontal force and the protrusion angle $\theta_D$. In this relationship curve, based on an assumption that $\mu_T$ and $\mu_D$ are 0.5, a multiplier of the horizontal force $F_H$ over the $F_T$ increases sharply when the protrusion angle $\theta_D$ exceeds 30°. For this reason, in order to increase the horizontal force compressing the bonded portion, it is preferable to set the protrusion angle of the shearing blades 3 and 4 at 30° or more.

Figure 5:
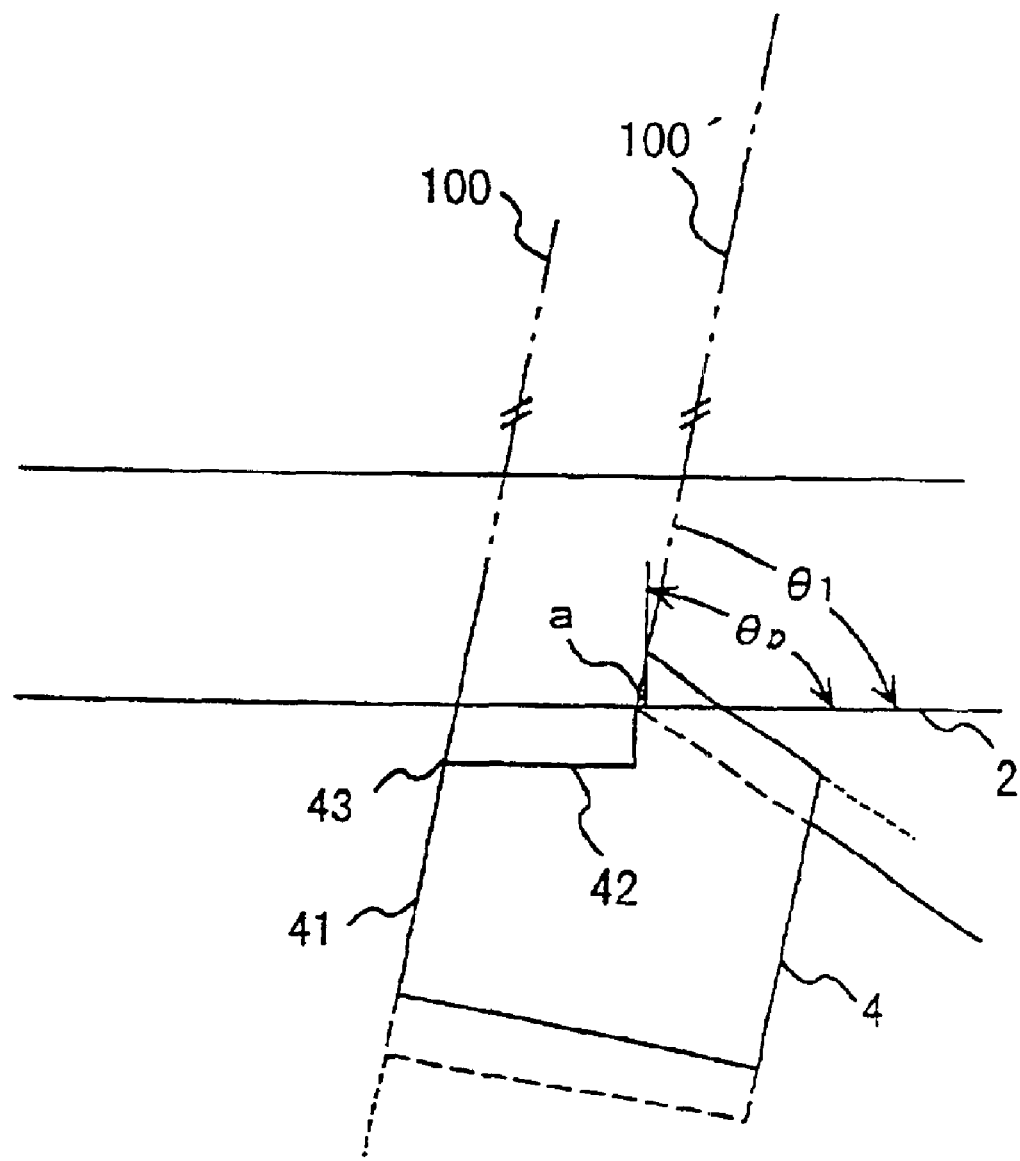
FIG. 5 is an explanatory drawing showing an upper limit of the protrusion angle.

FIG. 5 shows an upper limit of the protrusion angle $\theta_D$ of the protrusion on the shearing blade. The figure shows the relationship between the preceding bar 2 and the lower shearing blade 4, wherein the broken line of the shearing blade 4 represents a condition that the protrusion is in contact with the bar 2 and the bold line represent a condition that the protrusion has bitten into the bar. When the edge 43 of the shearing blade 4 moves along the operating locus 100 inclined with respect to the thickness direction of the bar 2, there is caused a gap "a" if the protrusion angle $\theta_D$ of the protrusion is greater than the angle $\theta 1$ of a line 100' in parallel to the operating locus 100 of the edge as shown in the figure. Because this gap "a" acts so as to release the compressive force to be applied onto the bonded portion, the bonding strength of the bonded portion decreases.

For this reason, an angle $\theta 1$ that does not cause any gap "a", i.e. an angle in parallel to the operating locus of the edge is the upper limit of the protrusion angle $\theta_D$. In other words, it is preferable that the protrusion angle $\theta_D$ shall be set within a range from 30° to an angle in parallel to the operating locus of the edge (which is equal to the inclination angle $\theta_J$ of the bonded portion in this embodiment) with respect to the top surface 42 of the shearing blade which gets in contact with the bar surface and presses.

Figure 6:
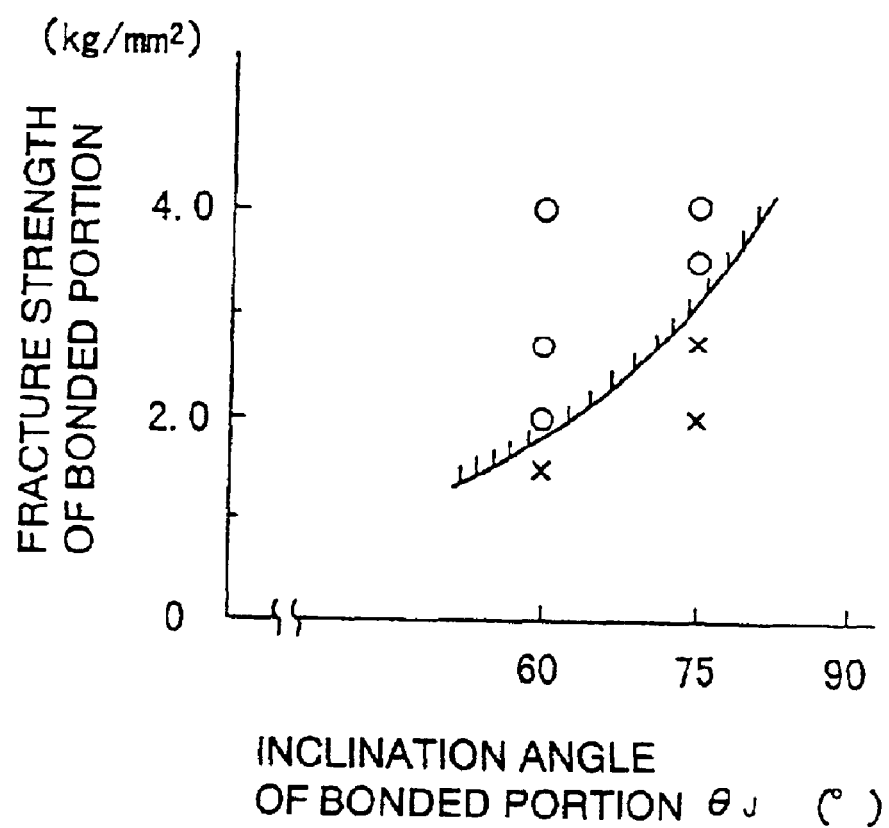
FIG. 6 is a characteristic chart showing the relationship between the inclination angle θJ of the bonded portion and the fracture strength of bonding.

FIG. 6 shows the relationship between the inclination angle $\theta_J$ of the bonded portion and the fracture strength of bonding. In the figure, each circle represents a case where no fracture is caused in the rolling process after bonding and each cross represents a case where fracture is caused. The result shows that the bonded portion is apt to fracture when the inclination angle $\theta_J$ varies under different bonding conditions, including the amount of overlap of the shearing blades and the pressing stroke, the required strength of the bonded portion is higher when the inclination angle $\theta_J$ is greater, that is, the bonded surface becomes inclined further. When the fracture strength becomes inclined further. When the fracture strength of the bonded portion is required to be around 3.0 kg/mm$^2$, the inclination angle $\theta_J$ of the bonded portion that does not cause fracture is 75° or less.

Figure 7:
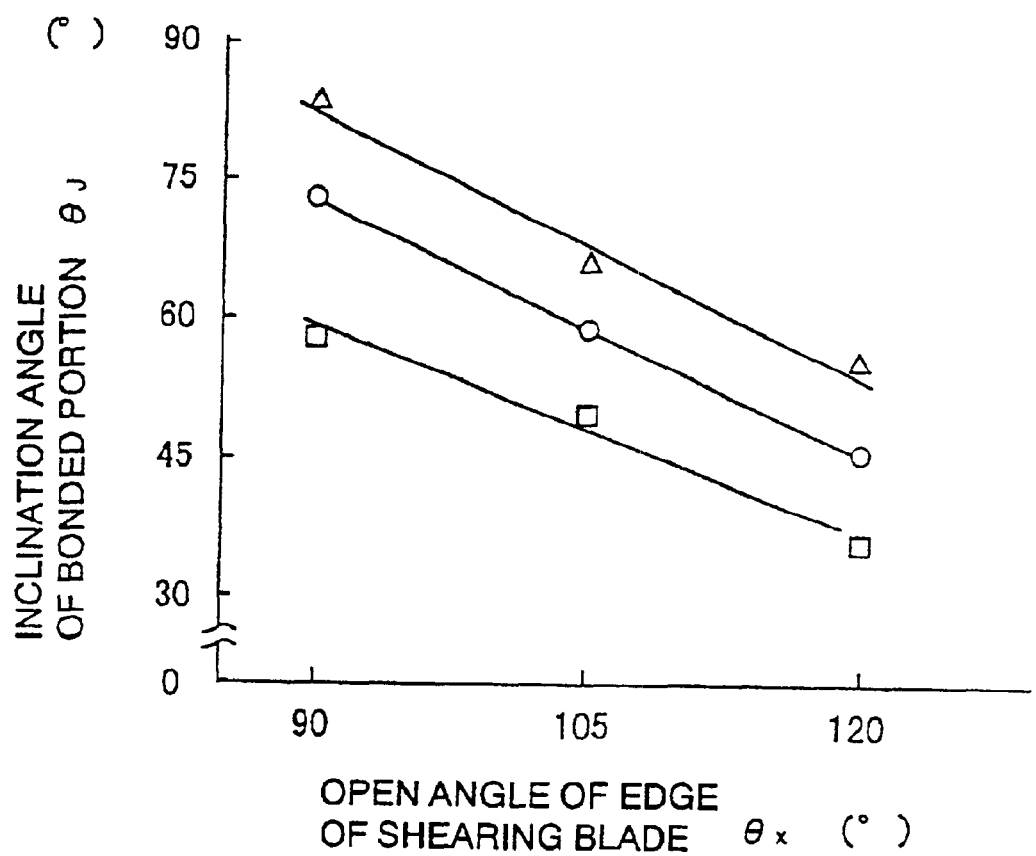
FIG. 7 is a characteristic chart showing the relationship between the open angle θX of the edge and the inclination angle θJ of the bonded portion.

FIG. 7 shows the relationship between the open angle $\theta_X$ of the edge and the inclination angle $\theta_J$ of the bonded portion. As shown therein, when the open angle $\theta_X$ of the edge is made greater, the inclination angle $\theta_J$ of the bonded portion can become smaller and the fracture strength of the bonded portion becomes higher. If the open angle $\theta_X$ of the edge is 90° or more, the inclination angle $\theta_J$ of the bonded portion can easily be made 75° or less.

In the meantime, if there is provided no overlap between the shearing blade 3 and the shearing blade 4 in FIG. 3, the operating locus of the edge of the shearing blade 3 falls on the same line as that of the shearing blade 4. On the contrary, as the amount of overlap becomes greater, the inclination angle $\theta_J$ of the bonded portion becomes smaller. In FIG. 7, each triangle represents a case where the amount of overlap is 0.1 mm, each circle represents the amount of overlap is 3 mm, and each square represents the amount of overlap is 10 mm. Thus, the shearing blade 3 and the shearing blade 4 are moved relatively and linearly in the edge direction and, at the same time, are overlapped each other so that the operating locus of one edge falls inside the other opposed edge. In other words, the shearing blades are so arranged that, after being pressed to the full, the upper shearing blade 3 partly overlaps the lower shearing blade 4, viewing from just above the upper shearing blade 3.

Figure 8A:
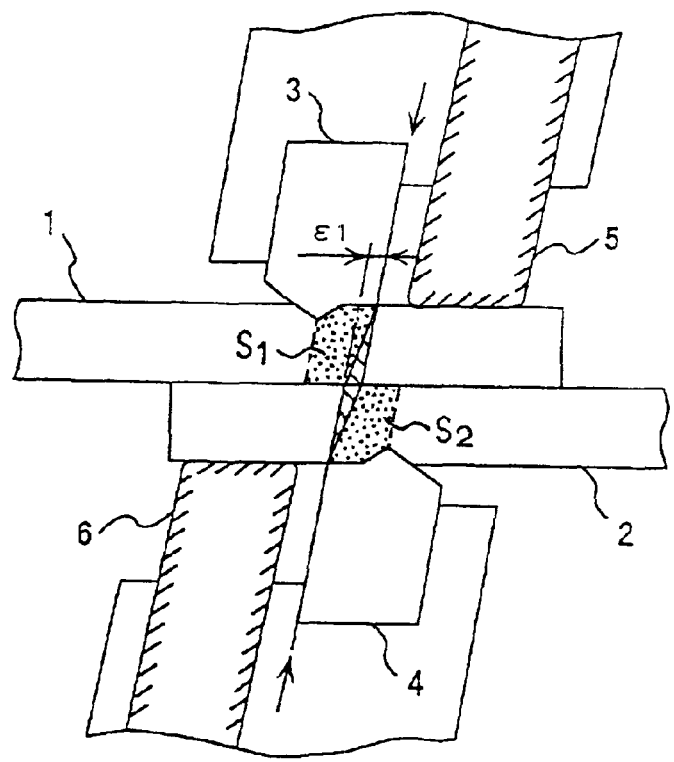
FIG. 8 is a typical drawing of a bonding apparatus provided with some amount of overlap.
Figure 8B:
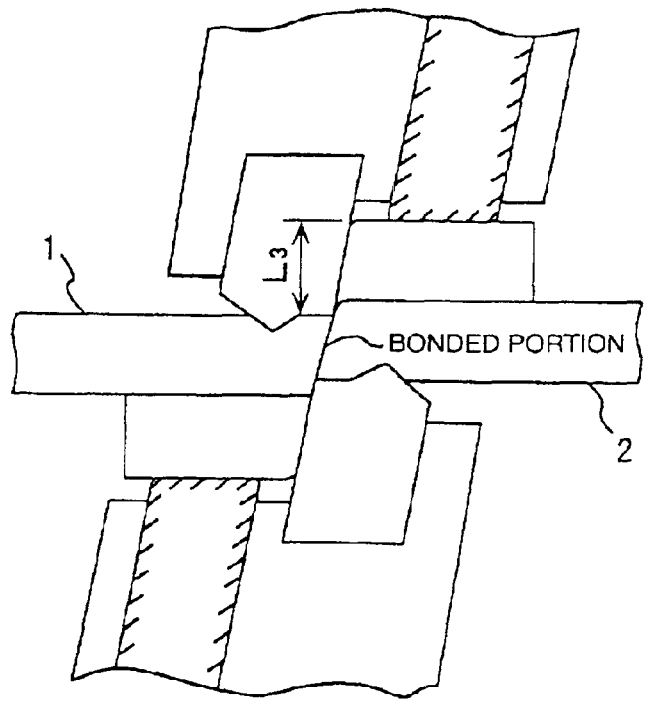

FIG. 8 is a typical drawing of a bonding apparatus provided with some amount of overlap, wherein a construction similar to that in FIG. 1 is shown briefly. (a) represents a condition just after the start of bonding, wherein the protrusions of the shearing blades 3 and 4 are pressed into the bars and the top surfaces 32 and 42 are in contact with the bar surfaces. (b) represents a condition upon completion of bonding, wherein the shearing blades have moved by the pressing stroke L3. The moving direction of the upper shearing blade 3 is the same as that of the lower shearing blade 4, but the shearing blades are so arranged that the extension lines of the operating loci of the edges overlap each other by $\epsilon_1$. The hatched portion having a rhomboid shape under the condition (a) is compressed in the bonding process up to the condition (b). A resilient force of the compressed portion acts as a compressive force upon the bonded portion. On this occasion, the pressing force caused by the protrusions 30 and 40 of the shearing blades 3 and 4 acts so as to support the compressive force applied onto the bonded portion.

As explained above, the bonding strength becomes higher as a result that a compressive force is applied onto the bonded portion. For bonding steel material, in order to attain a generally required bonding strength, it is desirous that the amount of overlap is 0.1 mm or more in the longitudinal direction of the metal plates to be bonded. In case of bonding soft material such as aluminum, a certain degree of bonding strength can be attained even if the amount of overlap is zero (if the amount of overlap is less than zero (<0), bonding according to the present invention is not available). On the other hand, an upper limit of the amount of overlap is determined as follows.

The area of the hatched portion in FIG. 8(a), that is, the area to be compressed is 450 mm$^2$ provided that the amount of overlap is 15 mm and the bar thickness is 30 mm. On the other hand, the area S(S1+S2) surrounded by the protrusions is 30×30×2=1,800 mm$^2$ approximately. Accordingly, the above means that a compressive deformation by 450/1,800= 25% has been generated in the vicinity of the bonded portion during the bonding process.

According to the stress-strain curve (FIG. 7.5) in a literature "Theory and Practice of Plate Rolling", given the bonding temperature as high as 800 to 1,200° C. and the strain of 25%, the compressive stress under that condition is near the upper limit. With too much amount of overlap, load applied to the bonding apparatus becomes excessive and consequently the abrasion resistance of the shearing blade edges and protrusions is deteriorated. For this reason, the upper limit of the amount of overlap shall preferably be set 15 mm.

When the protrusions 30 and 40 bite into the bars 1 and 2, respectively, the protrusions compress each bitten portion and this compression acts as a pressing force upon the bonded portion 50. As a result, with this force together with a pressing force caused by overlapping, the bonding strength can be further enhanced.

Figure 9A:
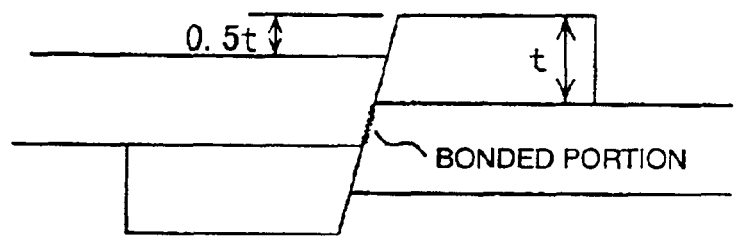
FIG. 9 is an explanatory drawing of the pressing stroke of a shearing blade.
Figure 9B:
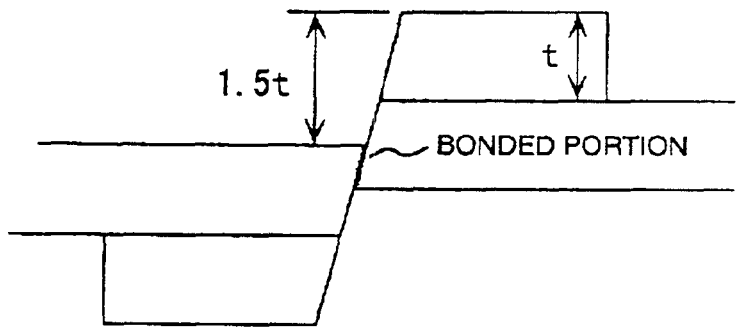

FIG. 9 is an explanatory drawing of the pressing stroke of a shearing blade, wherein (a) represents the minimum and (b) represents the maximum stroke. Generally speaking, the strength of the bonded portion is nearly equal to that of a base metal. On the other hand, while it Is essential that the bonded portion should not fracture after bonding until the connected bar is rolled and coiled, about a half the strength of the base metal is sufficient for the purpose. In order to allow the bonded portion to attain about a half the strength of the base metal, the minimum pressing stroke is ½ of the base metal thickness "t", or 0.5 t and the maximum is 1.5 times the base metal thickness "t", or 1.5 t.

Figure 10A:
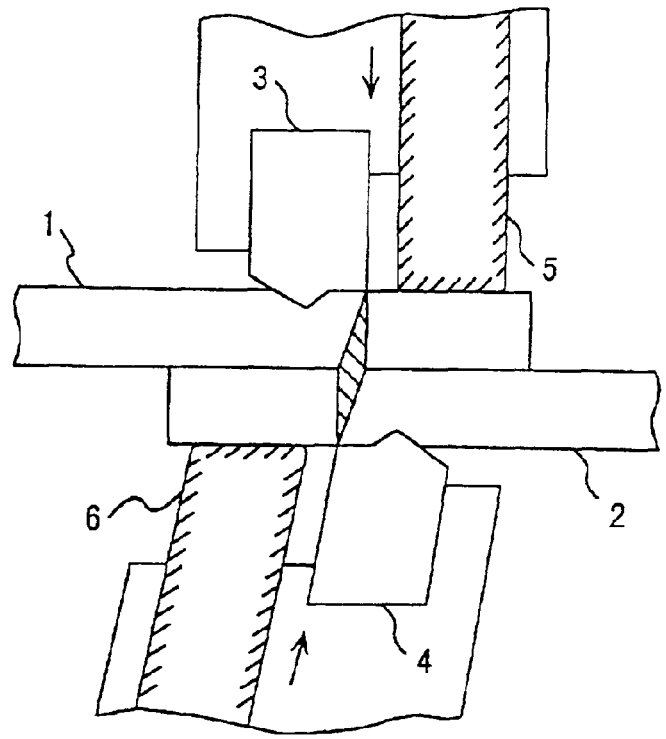
FIG. 10 is a typical drawing of a bonding apparatus according to another embodiment.
Figure 10B:
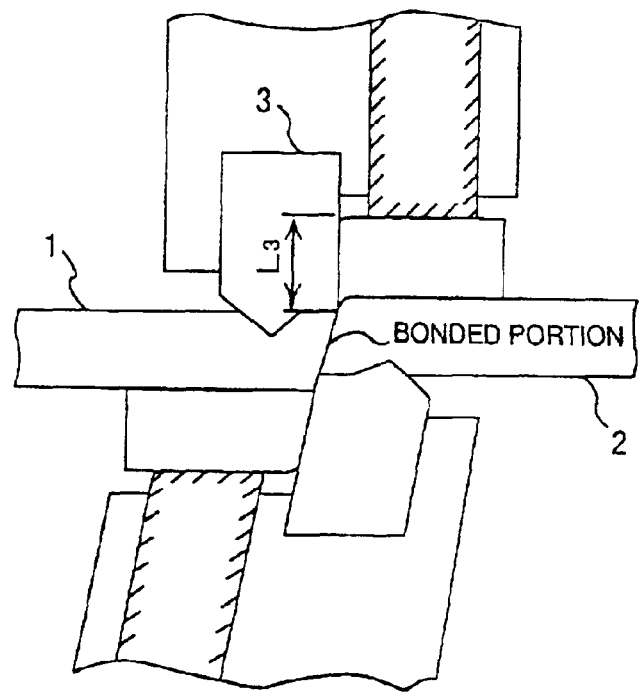

FIG. 10 is a typical drawing of a bonding apparatus according to another embodiment, which is shown corresponding to the conditions (a) and (b) in FIG. 8. This figure differs from FIG. 8 in that the upper shearing blade 3 moves in a perpendicular direction and the lower shearing blade 4 moves in an oblique direction with respect to the bar surface and that the two shearing blades are so arranged that the extension lines of the operating loci cross each other.

Since the hatched portion having a rhomboid shape under the condition (a) is compressed in the bonding process up to the condition (b), the bonding strength becomes higher as a result that a compressive force acts upon the bonded portion and the pressing force onto the bonded surface increases in the same manner as in the case where there is provided overlap.

As a variation to the bonding apparatus in FIG. 10, it is allowable that the upper shearing blade moves in an oblique direction and the lower shearing blade moves in a perpendicular direction. Otherwise, it is also allowable that both shearing blades moves in an oblique direction but the inclination angle is different. In short, any variation is acceptable provided that the upper and lower shearing blades are so arranged that the extension lines of the operating loci cross each other.

As a result of bonding explained above, the crops 11 and 12 are generated, being left over from the connected bar 13, as shown in FIG. 3. Although most part of each crop has already been cut off upon completion of bonding, some connection between the crop and the bonded portion may remain depending upon the stroke because, in the bonding method as explained above, the bonded portion has some angle with respect to the thickness direction of the metal plates. In order to be able to cut off the crop easily upon completion of bonding, it is desirous that a residual connection is made 5 mm or less in the thickness direction of the metal plates and the pressing stroke is made at least equal to the plate thickness or more, preferably 1.2 times the plate thickness or more. When the stroke is made 1.2 times the plate thickness or more, the residual connection thickness decreases and, at the same time, the plastic flow deformation factor of the bonded portion increases, resulting in much greater bonding strength.

Figure 11B:
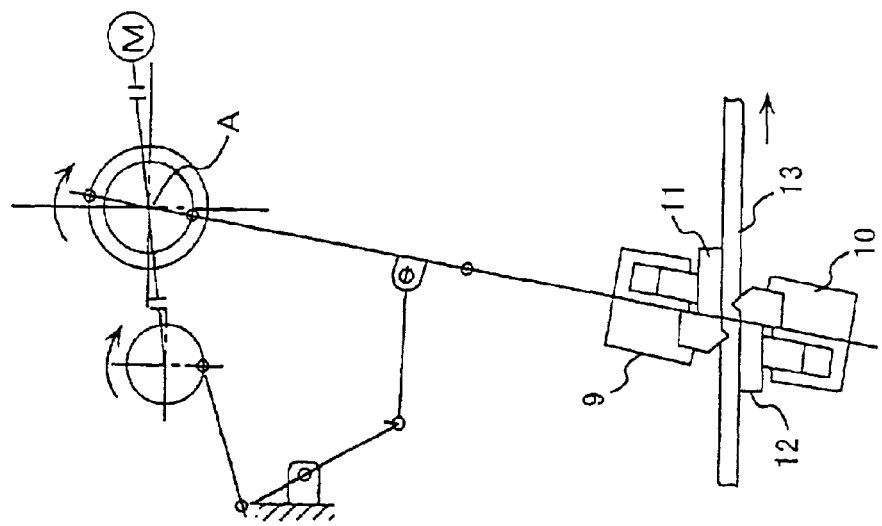
FIG. 11 is a brief structural drawing of the shearing blade drive mechanism.

Next, an example of a shearing blade drive mechanism which moves the upper and lower shearing blades along the above-mentioned operating loci is explained hereunder. FIG. 11 shows a brief construction of the shearing blade drive mechanism. The upper shearing blade 3 and the lower shearing blade 4 start moving from the start position of bonding and, via the completion position of bonding, return to the start position of bonding. In this operation, since the sheet bars to be bonded are running toward the downstream at a line speed, the upper and lower shearing blades are moved along the operating loci of the respective shearing blades, each shown by a dotted line, in synchronism with the movement of the sheet bars. For bonding immobile metal plates, a shearing blade drive mechanism capable of moving the pressing stroke simply up and down will serve the purpose.

A main crankshaft has two eccentric shafts with respect to its center A (the same point A shown in FIG. 1). The upper eccentric shaft is connected to the upper shearing blade and the lower eccentric shaft to the lower shearing blade, each via a linkage, and the shafts move the upper and lower shearing blades up and down (pressed or returned) in accordance with the rotating angle of the main crank shaft. In addition, a synchronizing shaft to be connected in synchronism with the main crankshaft, linked via an oscillating lever with the linkage of the upper eccentric shaft and with the linkage of the lower eccentric shaft, moves the upper and lower shearing blades toward the moving direction of the bars at nearly the same speed as the bar movement while the shearing blades are in contact with the bars and returns the upper and lower shearing blades to the original position when the shearing blades are no longer in contact with the bars.

Figure 11A:
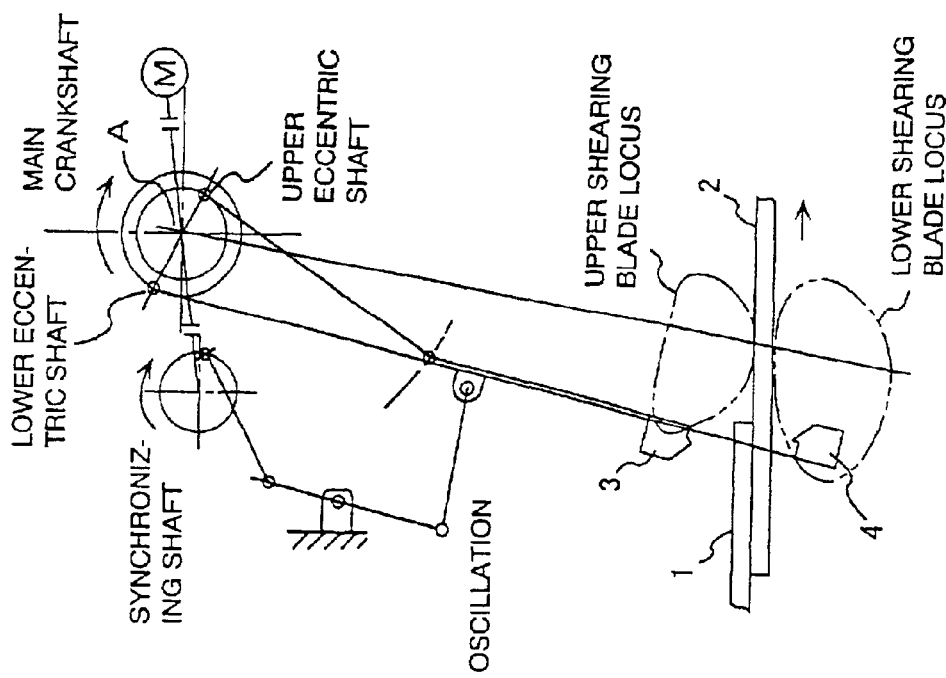

FIG. 11(a) represents a condition before the start of bonding. (b) represents a condition upon completion of bonding, wherein the upper eccentric shaft and the lower eccentric shaft are on the same line, viewing laterally. Since the upper and lower shearing blades are operated in accordance with the moving speed of the bars during bonding as explained above, no excessive tension or compression is applied to the sheet bars and, consequently, smooth bonding becomes available.

This shearing blade drive mechanism is constructed using almost the same drive mechanism as, for example, in a "Hitachi pendulum type frying shear" described in "Hitachi Hyouron" Vol. 61, No. 9 (1979-9). Variations are available to a synchronizing mechanism for synchronizing the shearing blades to the movement of the sheet bars. For example, it is possible to so construct the mechanism that, after the shearing blades have bitten in the bars up until the shearing blades are separated upon completion of bonding, the shearing blades are allowed to naturally follow the bar movement and, when the shearing blades have been separated to a specified position, the shearing blades are returned to the original position by means of spring, for example. That is, it not always necessary that the shearing blades are synchronized with the main crankshaft.

Figure 15:
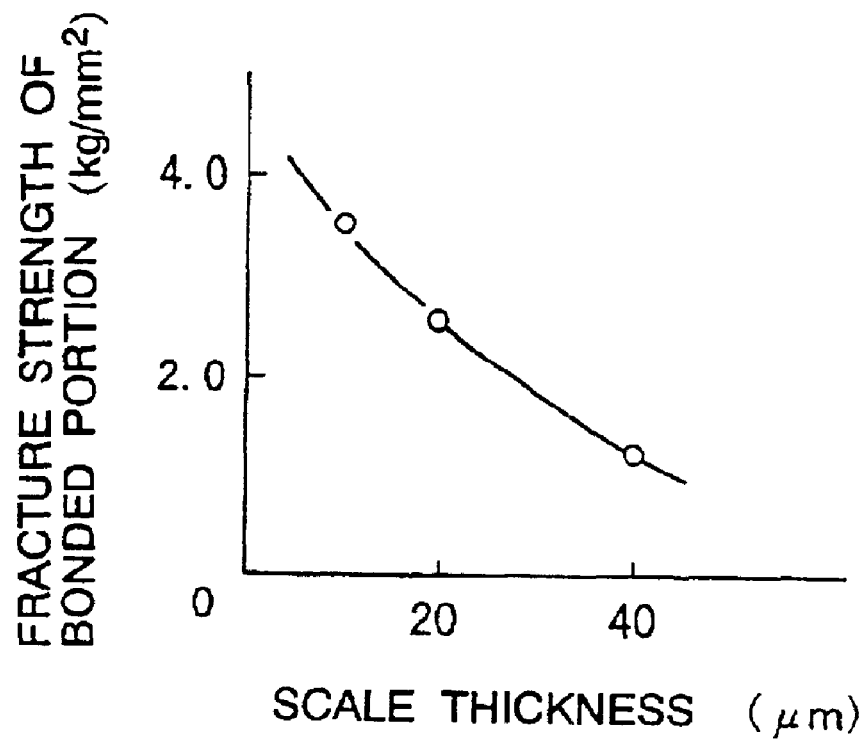
FIG. 15 is a characteristic chart showing the relationship between the scale thickness and the fracture strength of the bonded portion.
Figure 16A:
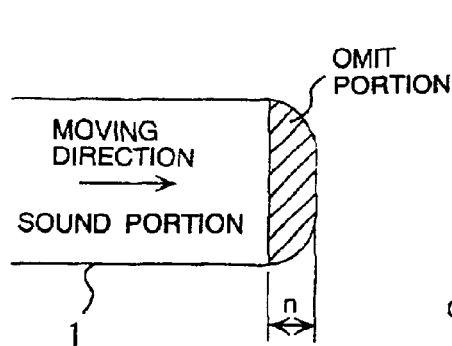
FIG. 16 is an explanatory drawing of the overlapped portion of the bars and the bonding position.
Figure 16B:
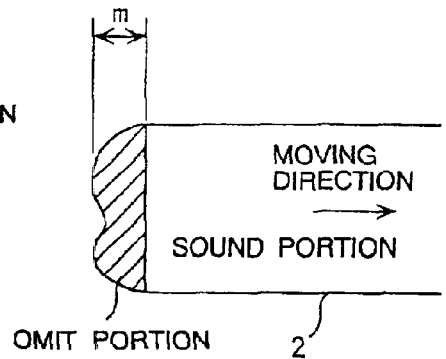
Figure 16C:
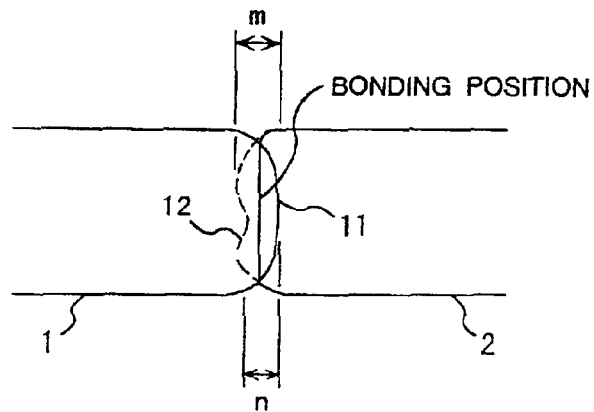
Figure 16D:
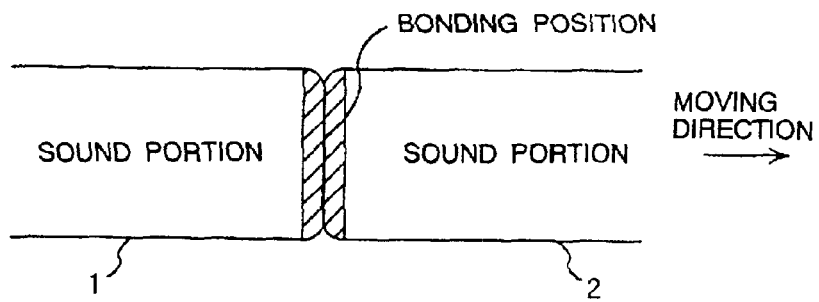

It is also possible to construct a bonding apparatus for shearing and bonding metal plates by moving the shearing blades in accordance with the moving speed of the sheet bars, using a drum type drive mechanism as disclosed in FIG. 5 of Japanese Application Patent Laid-Open Publication No. HEI 10-34203 (1998) or a pendulum type drive mechanism as disclosed in FIGS. 15 and 16 of the same Publication.

Figure 12:
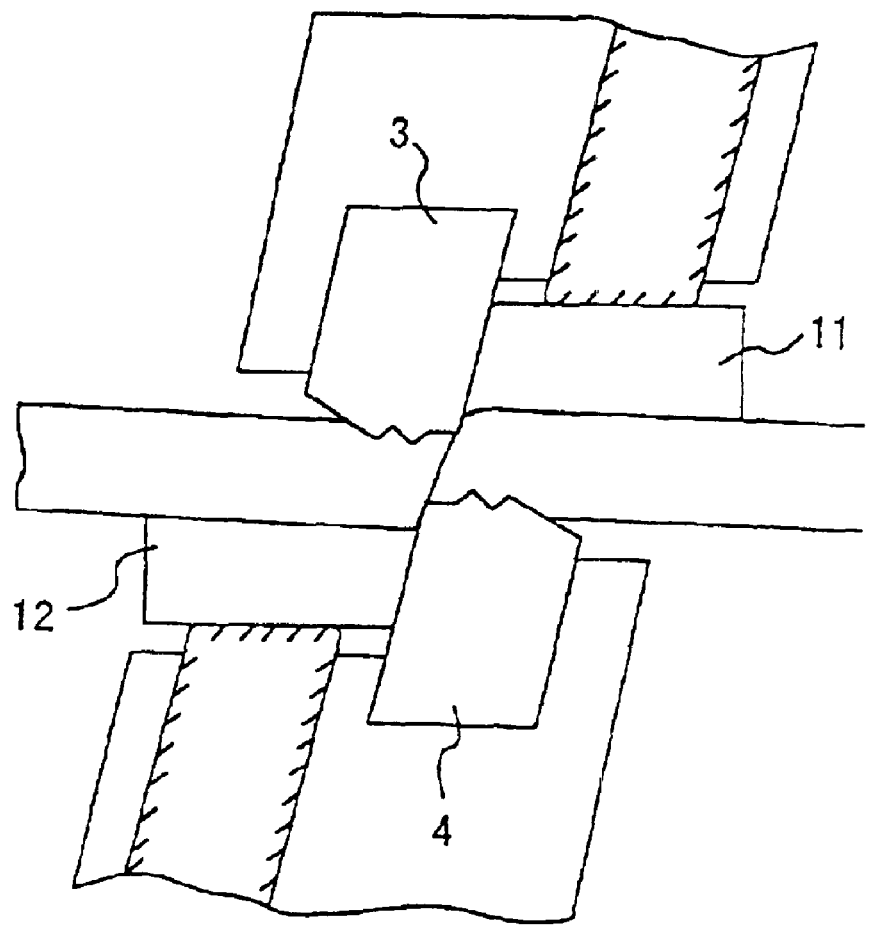
FIG. 12 is a typical drawing of another embodiment of a bonding apparatus equipped with shearing blades.

FIG. 12 shows another embodiment of shearing blades of a bonding apparatus. As shown in the figure, there are provided multiple protrusions on each upper shearing blade 3 and lower shearing blade 4. It is also allowable if either one of the upper and lower shearing blades is only provided with multiple protrusions. As explained previously, a protrusion generates a pressing force in a direction perpendicular to the shearing direction of the shearing blade and acts to compress the bonded portion. Since use of multiple protrusions allows to reduce load onto each protrusion, as compared to a case where there is provided only one protrusion, abrasion resistance of the protrusion can be improved. In addition, since each protrusion can be made lower and the amount of bite into the bar can be reduced accordingly, the quality of the connection after bonding improves.

In using multiple protrusions, shape and position of each protrusion shall not always be similar but can be such that, for example, protrusions are provided intermittently on the rear or that the entire width of the shearing blade surface is covered by the front and rear protrusions in total. That is, any construction is acceptable provided that the compressive force to be applied onto the bonded portion is effectively supported.

Figure 13:
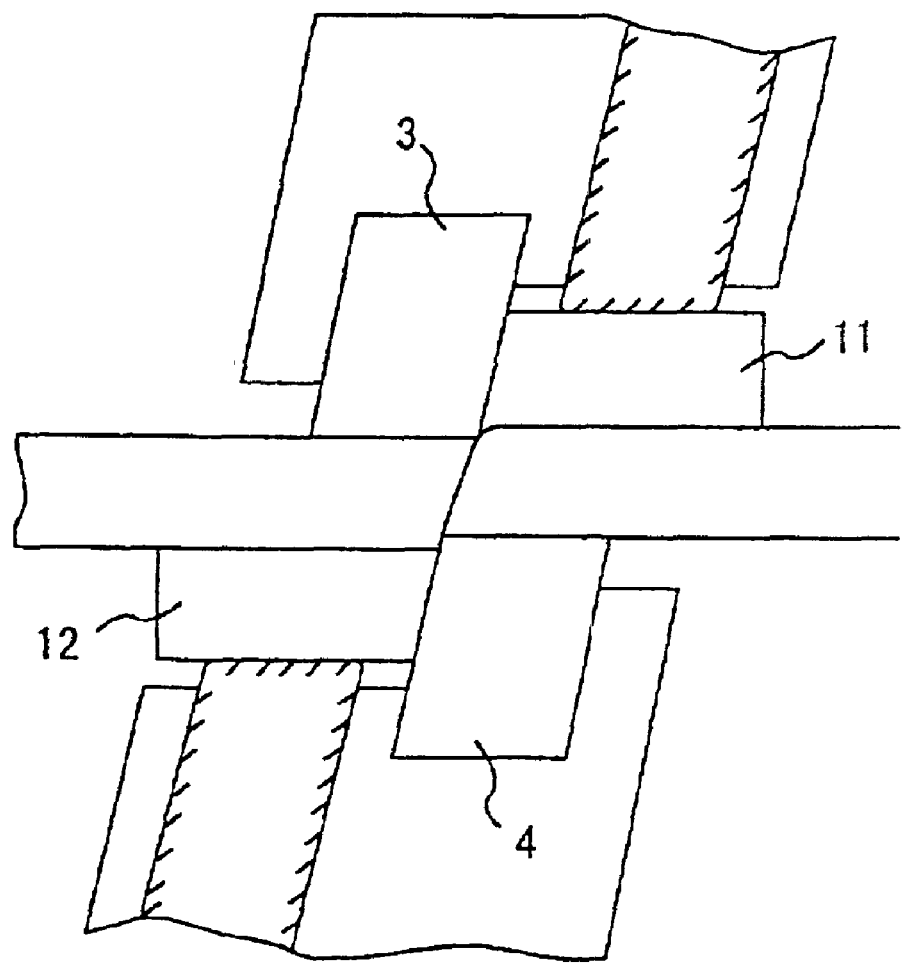
FIG. 13 is a typical drawing of another embodiment of a bonding apparatus equipped with shearing blades.

FIG. 13 is another embodiment of shearing blade of a bonding apparatus. An upper shearing blade 3 and a lower shearing blade 4 are provided in the same arrangement as in FIG. 1, but there is provided no protrusion. In this embodiment, since the bonded surface according to the bonding method of the present invention is formed in a shape having some angle ($\theta_f$) with respect to the thickness direction of metal plates, a compressive force to be generated on the bonded portion can be supported also by a horizontal force $F_H$ which is to be generated, as understood from the relationship ($\theta_D=0$) in equation (1), by the contact resistance or the like between the bar and the shearing blade. Although, because of the above, the compressive force to be generated on the bonded portion is smaller than in a case with protrusions, this embodiment is applicable depending upon the specification or required fracture strength of the material to be bonded.

Next, hereunder, an embodiment wherein the method of bonding metal plates according to the present invention is applied to a hot strip mill is explained. A hot strip mill in this embodiment is particularly equipped with an overlapping mechanism which overlaps a preceding bar and a following bar in the course of a production line and a bonding machine which bonds the overlapped portion also in the course of a production line.

Figure 14:
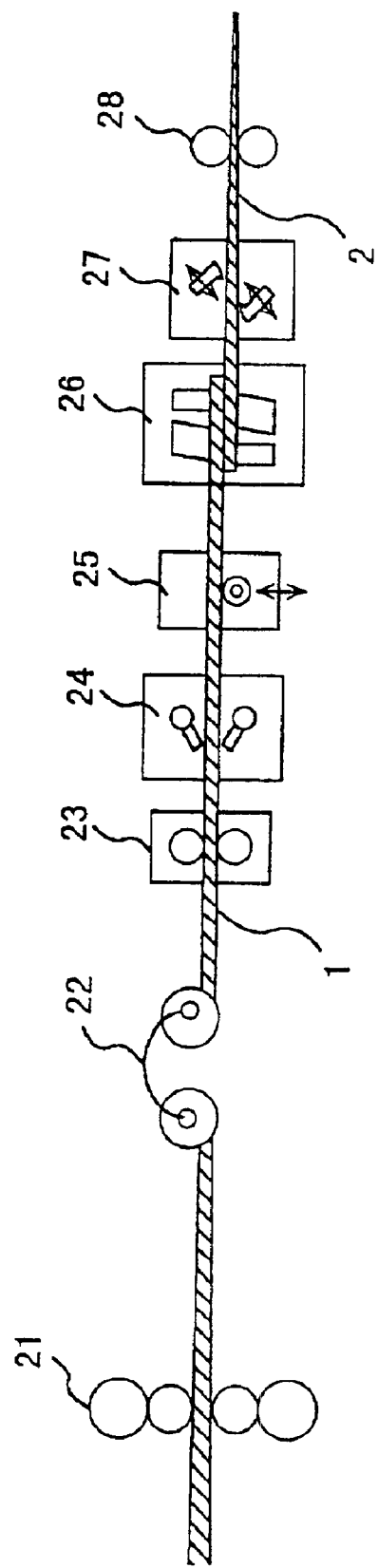
FIG. 14 is a structural drawing of a production line of a hot strip mill according to an embodiment.

FIG. 14 shows a brief construction of a production line of a hot strip mill according to an embodiment of the invention. There are provided, between a coarse rolling mill 21 and a bonding machine 26, an intermediate coiler 22 which takes up a metal plate and adjusts the speed, a crop shear 23 which cuts off an omit portion from a coarse bar, descaler 24, and a lifting apparatus 25 which is a mechanism for overlapping a following bar 1 and a preceding bar 2; and also there is provided a crop removing apparatus 27 between the bonding machine 26 and a finish rolling mill 28.

If the bonding machine 26 is equipped with a mechanism for moving on rails, the machine can be incorporated into an on-line production system. However, since the hot strip mill employs the aforementioned bonding apparatus of the present invention and accordingly the bonding time by the apparatus is shorter, it is possible, for example, by using a shearing blade drive mechanism shown in FIG. 11, to construct a bonding machine which shears and bonds metal plates while moving in accordance with the moving speed of the sheet bars.

As a result, the bonding machine 26 for bonding rolled strips, installed between the coarse strip mill 21 and the finish strip mill 28, can be so constructed as to complete bonding while moving in accordance with the feeding speed of hot rolled strips, and thereby, a looper which is to adjust the feeding speed by bending the hot rolled strips is no longer required.

The crop shear 23 cuts off the irregularly-shaped portion (omit portion) on the tip of a bar. Even when bars are bonded continuously, an omit portion of a particularly irregular shape is cut off so that no problem is caused in the operation of the bonding machine 25 or the crop removing apparatus.

The descaler 24 of this embodiment is incorporated into a unit together with the lifting apparatus 25, as described later, so that at least part of the sheet bars to be overlapped has been descaled before overlapping. There are various methods available as a descaling method, including mechanical cutting or grinding by a rotating cutter or mechanical broach, combustion gas jetting from an acetylene gas burner, etc., but this embodiment employs jetting high pressure water as an efficient and time-saving means.

FIG. 15 shows the relationship between the scale thickness and the fracture strength of the bonded portion. Because the fracture strength of the bonded portion increases as the scale thickness becomes less, it is preferable that the rolled strips are overlapped after the surfaces have been descaled to a possible extent. Descaling needs not be performed on the entire surface of the overlapped portion but it is rather preferable to perform descaling in a limited region that is to be deformed into a bonded surface.

Figure 24:
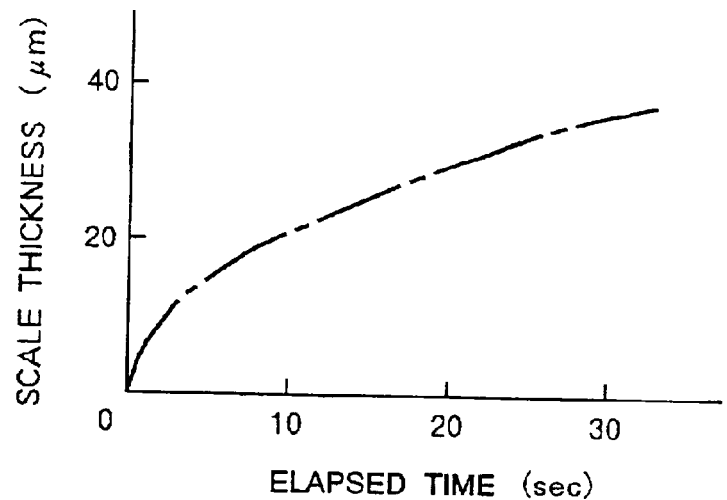
FIG. 24 is a characteristic chart showing the relationship between the elapsed time after descaling and the scale thickness.

FIG. 24 shows the relationship between the scale thickness and the elapsed time after descaling.

Figure 25:
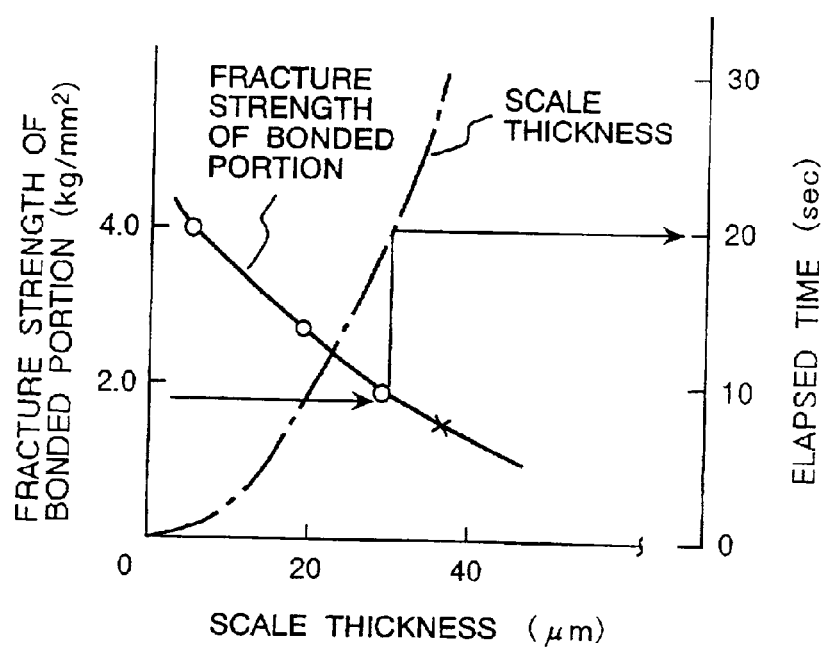
FIG. 25 is a characteristic chart showing the relationship among the elapsed time after descaling, the scale thickness, and the fracture strength of the bonded portion.

FIG. 25 shows the relationship among the elapsed time after descaling, the scale thickness, and the fracture strength of the bonded portion, combining FIG. 15 and FIG. 24 into one figure. The fracture strength of the bonded portion depends upon the inclination angle $\theta_j$ of the bonded portion as shown in FIG.6 but, if $\theta_j$ is 60° or less, it is possible to achieve higher fracture strength than the one causing fracture during the rolling process by maintaining the elapsed time 20 seconds or less.

Next, explanation about the lifting apparatus 25 which overlaps the portions to be bonded of the preceding bar and the following bar is given hereunder. Before explaining about the mechanism of the lifting apparatus, the relationship among the overlapped portion of the two bars, crops, and the bonding position is explained first.

FIG. 16 is an explanatory drawing of the overlapped portion of the bars and the bonding position. (a) shows an omit portion of the bar 1, the following strip, and (b) shows an omit portion of the bar 2, the preceding strip. To make sure, these are the omit portions that need not be shaped by the crop shear 23. A portion in a length of "n" on the upper bar 1 and a portion in a length of "m" on the lower bar 2 are the portions that are by nature supposed to be thrown away as omit portion because the width is insufficient.

(c) shows a condition where the bars 1 and 2 are overlapped, and (d) shows the bonding position after bonding, wherein the hatched portions outside the bonding position are the crops. The overlap in (c) is determined so that the bonding position is set at a portion which falls within "n" of the upper bar 1 and "m" of the lower bar 2 and, at the same time, which causes the width of the two bars to be nearly equal. Since, by trying to set the overlapped portion limitedly on the omit portion of both bars, most of the crops after bonding come from the omit portion, yield of the sheet bars can be improved.

Figure 17:
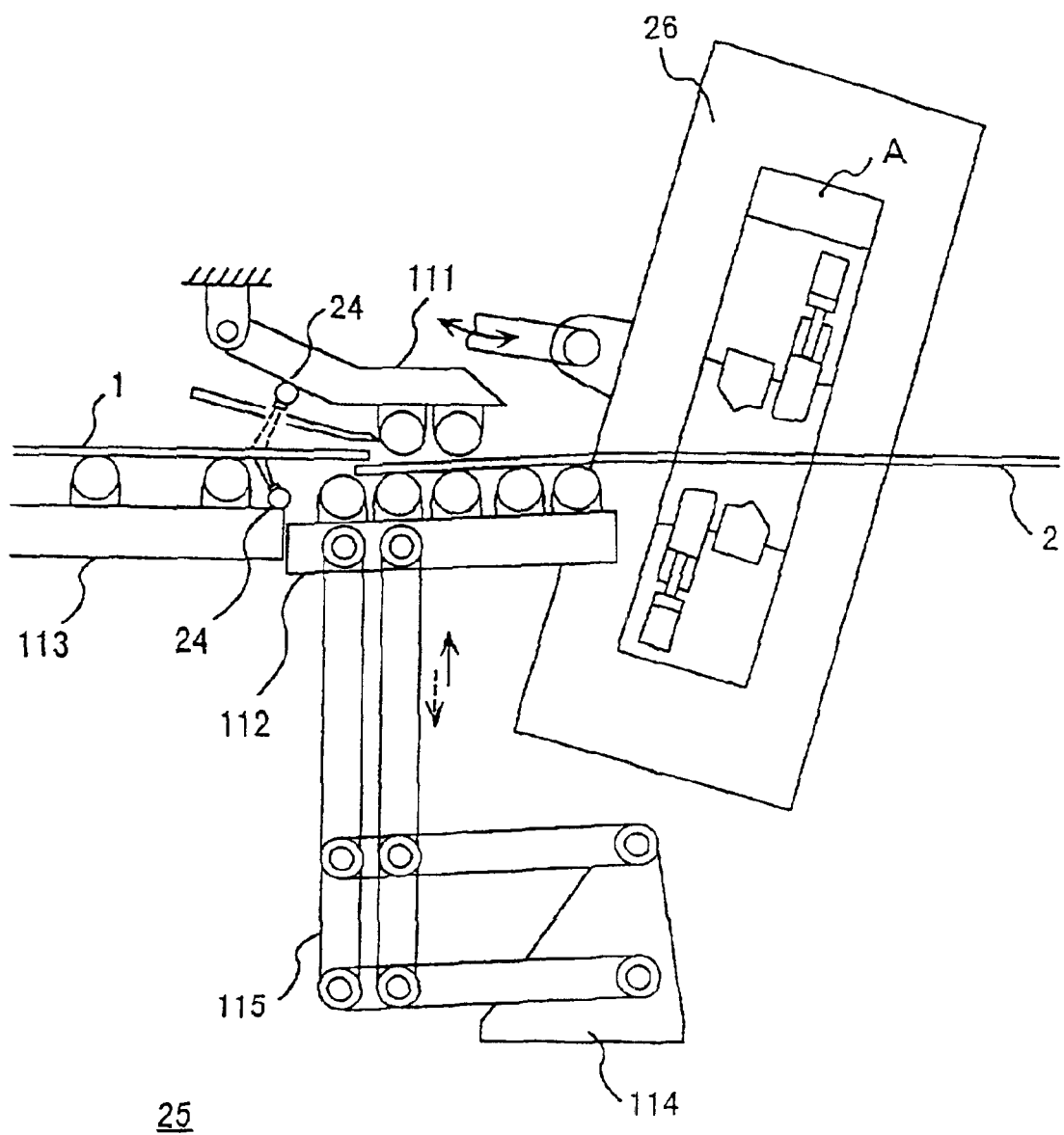
FIG. 17 is a structural drawing of a lifting apparatus for overlapping the preceding bar and the following bar.

The construction and operation of the lifting apparatus which overlaps the portions to be bonded of the preceding bar and the following bar are explained hereunder, using FIGS. 17 to 20. FIG. 17 shows the construction of a lifting apparatus according to an embodiment of the invention. A lifting apparatus 25, installed closely before the bonding machine 26 in a production line, comprises an upper roller set 111, a lifting roller set 112, a table roller set 113, a base 114, and a linkage 115. A jet-type descaler 24 is installed each on the upper roller set 111 and on the table roller set 113 so that only the surface to be overlapped is descaled just before overlapping and that no heat is taken away from other portions of the bar.

Figure 18:
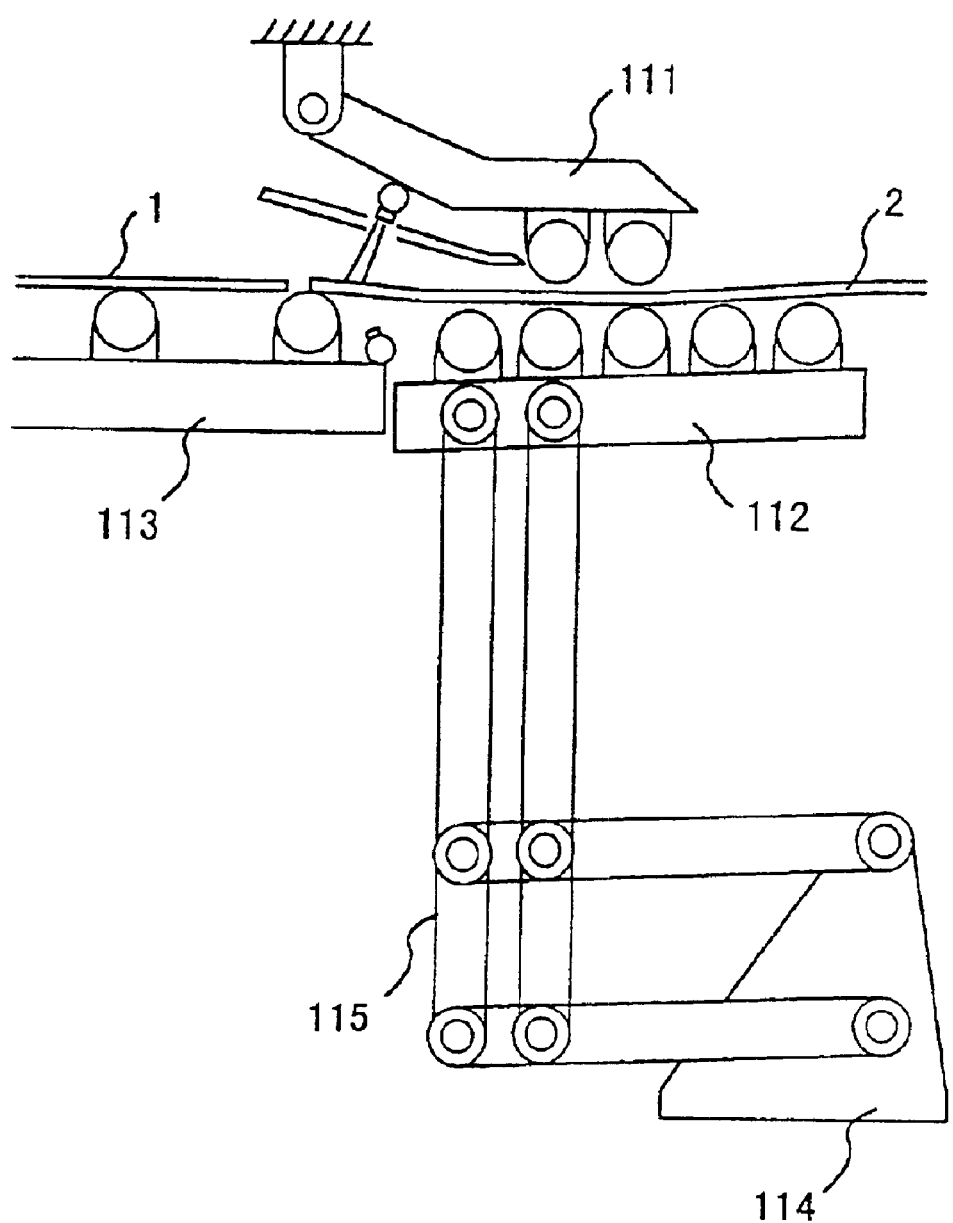
FIG. 18 is an explanatory drawing showing the start condition of the overlapping operation of the lifting apparatus.
Figure 19:
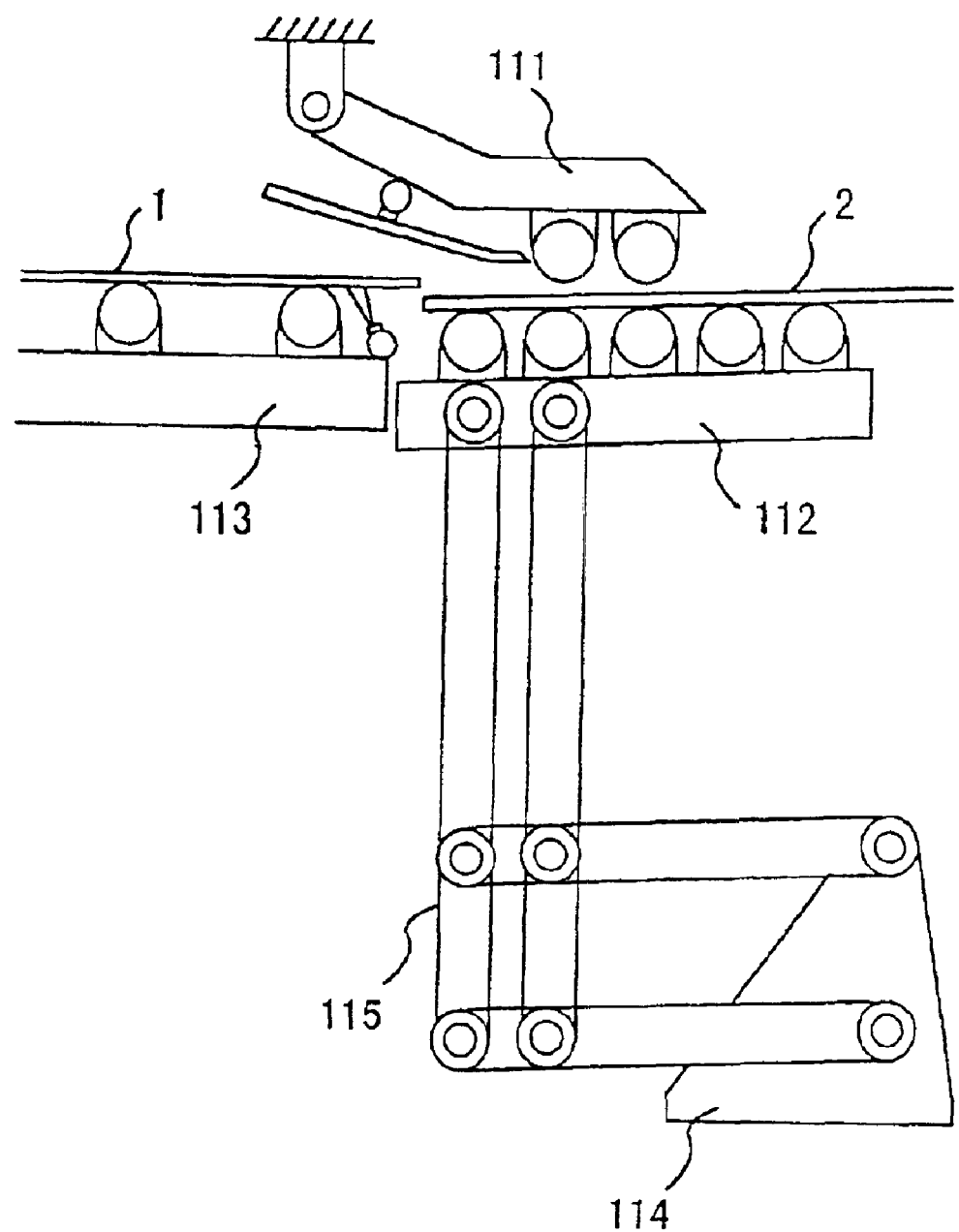
FIG. 19 is an explanatory drawing showing the in-process condition of the overlapping operation of the lifting apparatus.
Figure 20:
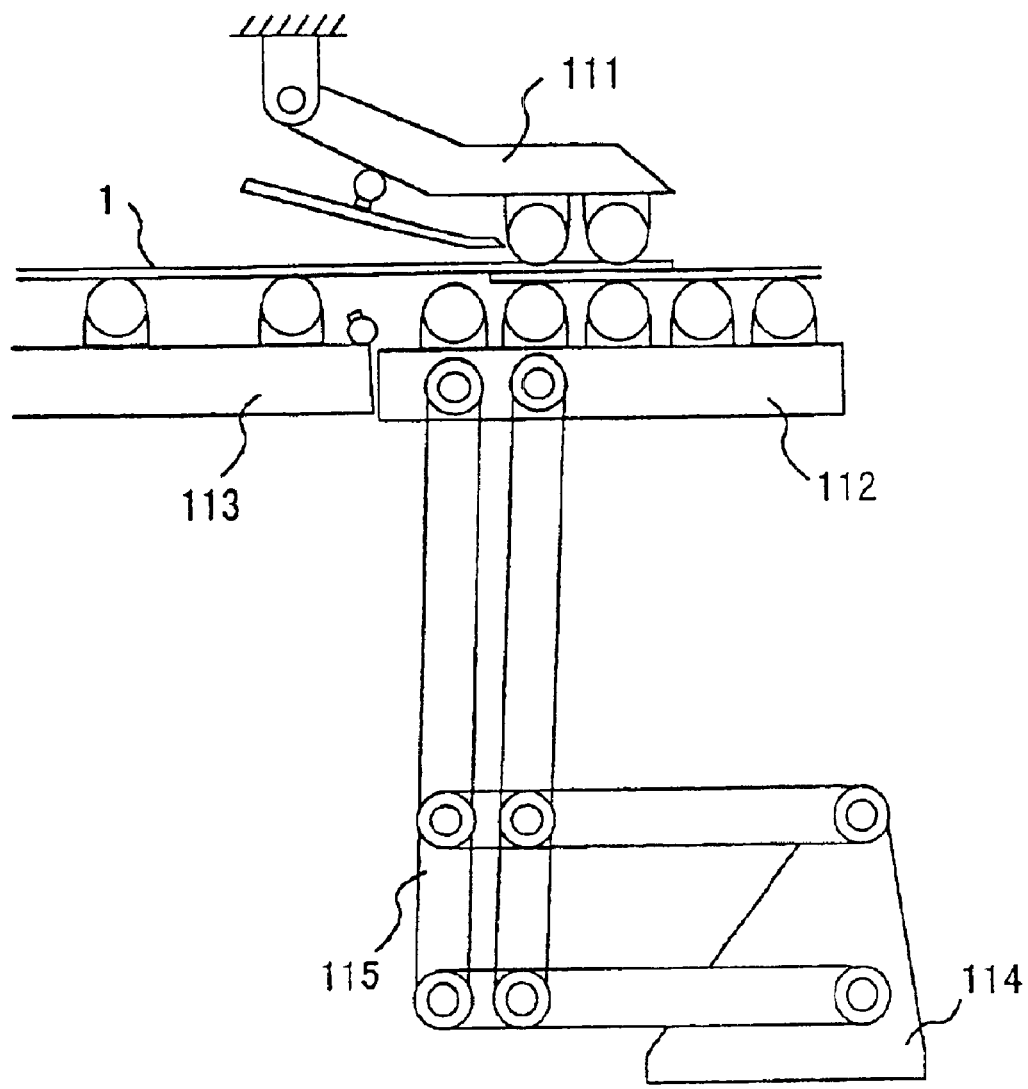
FIG. 20 is an explanatory drawing showing the ending condition of the overlapping operation of the lifting apparatus.

FIG. 18 shows a condition where the trailing end of the preceding bar 2 is about to leave the table roller set 113. When this condition is detected, the table roller set 113 accelerates the following bar 1 to feed faster. As shown in FIG. 19, the lifting roller set 112 has already been positioned at a lowered condition. The accelerated bar 1 is moved over the bar 2 and the portions to be bonded are overlapped each other as shown in FIG. 20. When overlapping the sheet bars by a specified length is complete, the accelerated following bar 2 is returned to the original speed and the bars 1 and 2 are supported by the upper roller set 111 and the lifting roller set 112 which has been lifted again. The following bar 1 and the preceding bar 2, already overlapped as above, move at the same speed toward the bonding machine 26.

When the overlapped portion of the bars 1 and 2 have reached, the bonding machine 26 starts bonding, that is, each of the shearing blades 3 and 4 is pressed into the sheet bar in an oblique direction at a stroke greater than the thickness of the bar so as to effect plastic flow deformation and perform bonding. The stroke L3, the inclination angle $\theta_j$ of the bonded portion, the amount of overlap 1, etc. of the upper shearing blade 3 and lower shearing blade 4 have been specified so that sufficient plastic flow deformation can be effected on part of the overlapped portion. The bonded bars are removed of crops by the crop removing apparatus 27, and then transferred to the finish rolling mill 28.

Figure 21A:
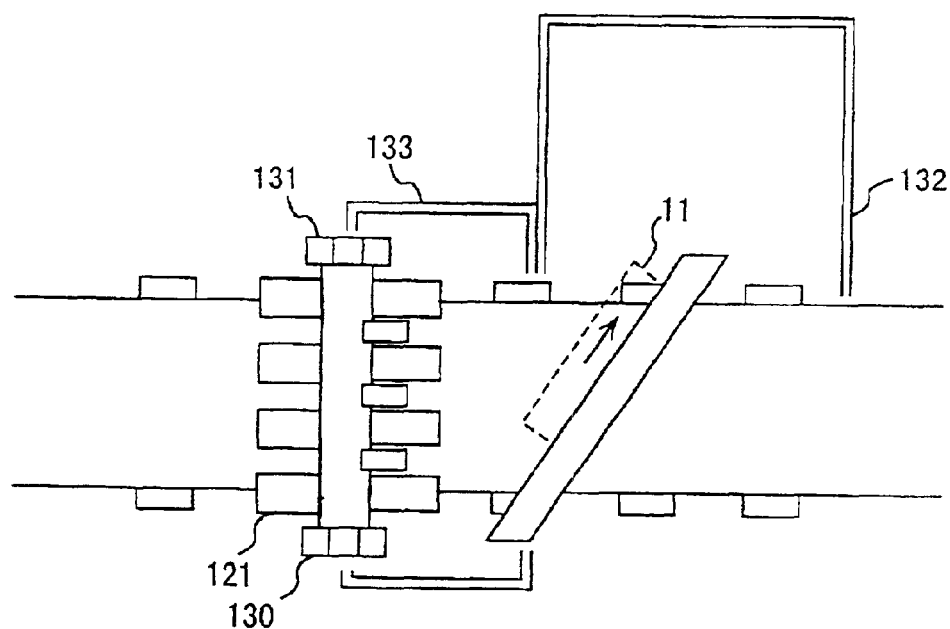
FIG. 21 is a structural drawing of the crop removing apparatus.
Figure 21B:
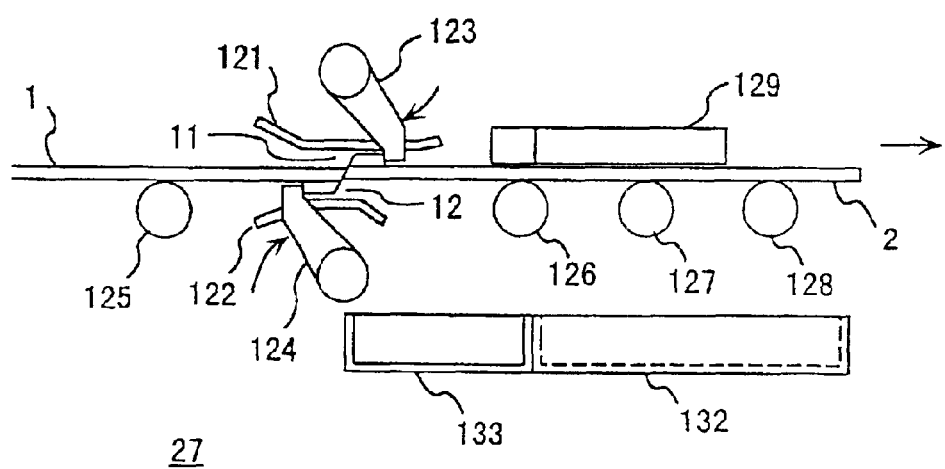

FIG. 21 shows the construction of the crop removing apparatus, where (a) is a plan view and (b) is a front view. The crops 11 and 12, which have been left over as a result of bonding the bars 1 and 2, still remain on the top and the bottom near the bonded portion because of remaining minimal connection. While the bonded portion is moved forward by the table rollers 125 to 128, both an upper chopper 123 supported by chopper rotor supports 130 and 131 and a lower chopper 124 supported in a similar way are rotating; and when the choppers hit the upper crop 11 and the lower crop 12, respectively, each crop is separated from the bar. After this, the lower crop 12 slides along a lower guide 122 and drops into a lower-crop bucket 133. The upper crop 111 moves along an inclined upper stopper 129 and drops into an upper-crop bucket 132. Although the crop removing apparatus 27 in FIG. 21 is shown as a stand-alone unit for the convenience of explanation, the apparatus shall preferably be installed adjacent to the bonding machine 26 so as to remove crops just after the completion of bonding.

In bonding metal plates of different thickness or sheet bars of different width, special consideration is needed to cut off crops smoothly. In bonding metal plates of different thickness, it is recommended to set the pressing stroke in accordance with the thicker one. By this, a crop to be left over from the thicker plate would have a least possible remaining connection as if almost cut off at the time of bonding.

For this purpose, there is provided a stroke adjusting mechanism by which the thickness of a plate to be bonded can be detected or set and the pressing stroke of the bonding machine 26 can be adjusted automatically or manually. In bonding metal plates of different width, there are some methods available: for example, cutting the plates to the same width using a shear in the course of overlapping up to bonding, or using a bar guide for the shearing blade to be applied onto the narrower plate as disclosed in Japanese Patent Application Laid-Open Publication No. HEI 10-034203 (1998).

Figure 22A:
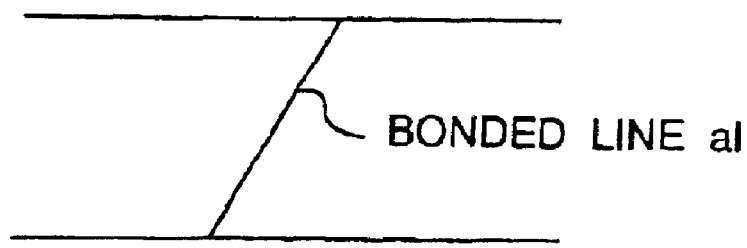
FIG. 22 is a typical drawing of the bonded portion after bonding and after rolling.
Figure 22B:
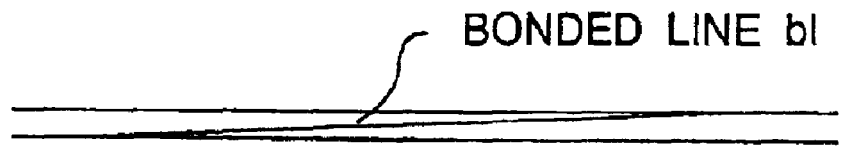
Figure 23A:
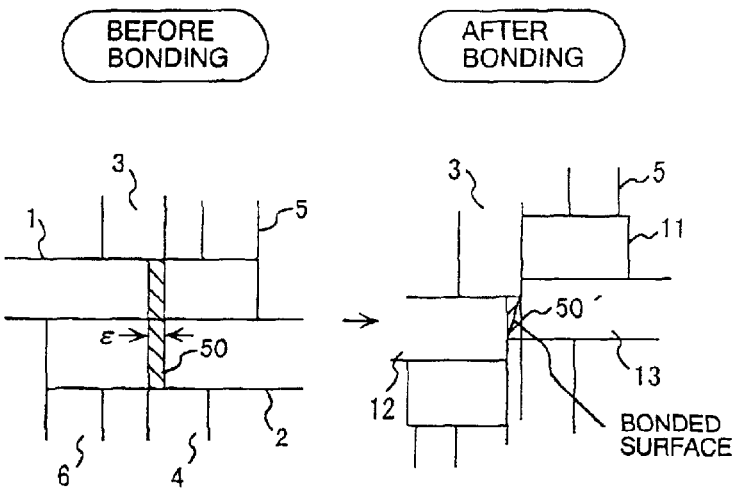
FIG. 23 an explanatory drawing showing the effect of the method of bonding metal plates according to the present invention.
Figure 23B:
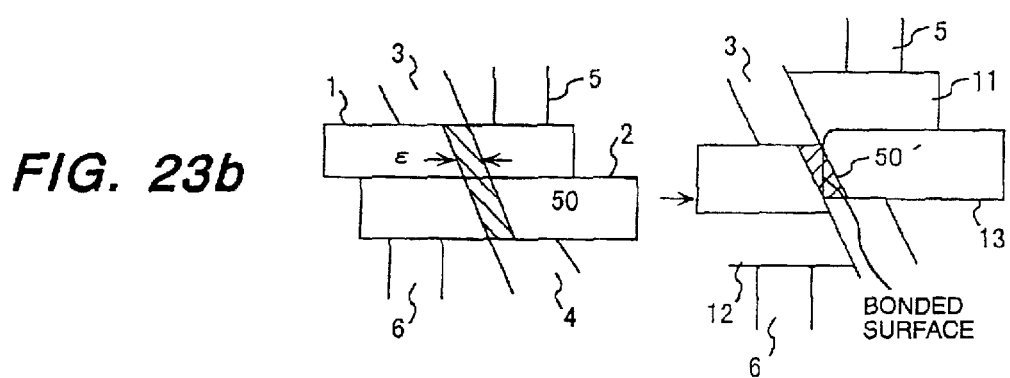
Figure 23C:
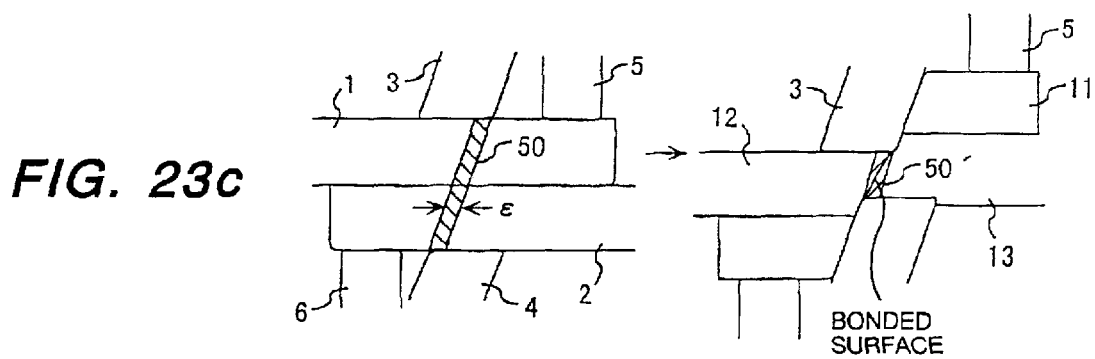

FIG. 22 is a typical drawing of the bonded portion, where (a) shows the bonded line upon completion of bonding and (b) shows the bonded line upon completion of rolling after bonding. Through rolling, the bonded line "al" is elongated to "bl" corresponding to the extent of rolling. Since the inclination becomes greater and hence the bonded area increases in this way as a result of rolling, the fracture resistance against a tension to be applied between rolling stands increases. Because the tension per unit area between rolling stands becomes higher particular in later stages, it is preferable from a view point of strength that the bonded area increases as the rolling process proceeds.

According to the hot rolling mill of this embodiment, continuous connection of sheet bars is possible and yet no additional heating energy is needed for bonding because the leading end and the trailing end of the sheet bars can be bonded on-line. This bonding method, in the course of the bonding process where the shearing blades are pressed in an oblique direction with respect to the thickness direction, makes it possible to apply sufficient pressing force onto the bonded portion with the aid of protrusions on the shearing blades and realize solid-phase diffusion bonding associated with high fracture strength. Thus, it should not happen that the bonded portion fractures during rolling or scratches the roller surface of the rolling mills.

In addition, although rigid bonding can be achieved when the pressing depth is set 50% or more of the sheet bar thickness, it is recommended to set the pressing depth equal to or more than the sheet bar thickness in order to perform separation of remaining crops at the same time of bonding. When this is done, it may happen that a crop separation process can be omitted.

Bonding time basically depends upon the pressing speed. Because a pressing speed of about 100 mm/s, for example, can be realized, it becomes possible to perform bonding in a short time, following the plate speed of a hot strip mill. Thus, a long production line for bonding is no longer needed. Further, because a looper can be omitted, the distance between an intermediate coiler and a finish rolling mill can be reduced drastically.

According to the method of bonding metal plates and the apparatus therefor of the present invention, because the shearing blades are overlapped each other and pressed in the thickness direction from both sides of the metal plates and/or the shearing blades are equipped with protrusions, a pressing force pressing the sheared surfaces onto each other is generated in the shearing process and the bonded portion is compressed, and hence it is possible to improve the bonding strength and shorten the bonding time because. Since the shearing blades on both sides, opposed each other, are moved relatively, it becomes possible not only to shorten the bonding time but to prevent deformation of the metal plates after bonding.

Because, according to the present invention, the above-mentioned bonding apparatus that bonds the preceding bar and the following bar, following up the movement of the bars, is incorporated between a coarse rolling mill and a finish rolling mill, it becomes possible to provide a hot strip mill where rolled strips are processed on-line continuously. In addition, because of a compact construction capable of following up the bar movement and also because of a possibility of omitting a looper, the production line length can be made shorter. Moreover, because of a special mechanism that overlaps the omit portions of the bars, waste material to be thrown away after bonding can be reduced.

What is claimed is:

1. A method of bonding metal plates at an overlapped portion, comprising steps of:

applying an upper shearing blade assembly comprising a first shearing blade and a clamp adjoining the first shearing blade onto one side of an overlapped portion;

applying a lower shearing blade assembly comprising a second shearing blade and a clamp adjoining the second shearing blade, wherein the overlapped portion is sandwiched by the upper and lower shearing blade assemblies during shearing of the metal plates by moving said first and second shearing blades under a clamp supporting force, and wherein at least one of the upper and lower shearing blade assemblies is disposed as to impart the clamp supporting force to the overlapped portion in the direction inclined with respect to the thickness direction of the plates; and bonding a sheared portion of the plates by the deformation of each sheared surface under the clamp supporting force thereby to form a bonding face between the plates in a direction inclined with respect to a thickness direction.

2. A method of bonding metal plates according to claim 1, wherein the upper and lower shearing blade assemblies are moved in opposing directions.

3. A method of bonding metal plates according to claim 1, wherein both of the upper and lower shearing blade assemblies is so disposed as to impart the clamping supporting force to the overlapped portion in the direction inclined with respect to the thickness direction of the plates.

4. A method of bonding metal plates according to claim 1, wherein the inclination angle of the bonded portion of bonded surface is 75° or less.

* * * * *